United States Patent
Luo et al.

(10) Patent No.: US 8,942,208 B2
(45) Date of Patent: Jan. 27, 2015

(54) WIRELESS COMMUNICATION HAVING REDUCED FEEDBACK DELAY

(75) Inventors: Tao Luo, San Diego, CA (US); Durga Prasad Malladi, San Diego, CA (US); Xiaoxia Zhang, San Diego, CA (US); Juan Montojo, San Diego, CA (US); Sai Yiu Duncan Ho, San Diego, CA (US); Nathan Edward Tenny, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 920 days.

(21) Appl. No.: 12/819,355

(22) Filed: Jun. 21, 2010

(65) Prior Publication Data

US 2010/0322177 A1     Dec. 23, 2010

Related U.S. Application Data

(60) Provisional application No. 61/219,302, filed on Jun. 22, 2009.

(51) Int. Cl.
  *H04W 4/00* (2009.01)
  *H04L 1/18* (2006.01)

(52) U.S. Cl.
  CPC .............. *H04L 1/1825* (2013.01); *H04L 1/189* (2013.01)
  USPC ........... 370/332; 370/329; 370/236; 370/341; 370/331

(58) Field of Classification Search
  USPC .................. 370/335, 329, 236, 341, 332, 331
  See application file for complete search history.

(56) References Cited

U.S. PATENT DOCUMENTS 6,021,124 A * 2/2000 Haartsen ...................... 370/336
6,915,477 B2 * 7/2005 Gollamudi et al. ........... 714/774

(Continued)

FOREIGN PATENT DOCUMENTS

CN    101197640 A    6/2008
JP    2007536876 A   12/2007

(Continued)

OTHER PUBLICATIONS

Alcatel-Lucent: "Multi-Process Transmission Technique to Improve Uplink Coverage for LTE", 3GPP Draft; R1-080443, 3rd Generation Partnership Project (3GPP), Mobile Competence Centre ; 650, Route Des Lucioles ; F-06921 Sophia-Antipolis Cedex ; France, vol. RAN WG1, no. Sevilla, Spain; Jan. 9, 2008, XP050108961, [retrieved on Jan. 9, 2008].

(Continued)

*Primary Examiner* — Ricky Ngo
*Assistant Examiner* — Dewanda Samuel
(74) *Attorney, Agent, or Firm* — Dalei Dong

(57) ABSTRACT

Providing for improved error control signaling in wireless communications is disclosed herein. By way of example, multiple transmissions can be conducted for a HARQ process prior to a scheduled feedback signal on the HARQ process, causing a receiving device to combine the multiple transmissions, rather than treat them as separate transmissions. In this manner, multiple transmissions can be employed to increase overall receive energy, without violating maximum transmit power constraints in a wireless communication. Further, these multiple transmissions can be configured based on prevailing signal strength at the receiving device, or based on processing capabilities of the receiving device, providing flexible protocols that can accommodate advanced as well as legacy UEs in wide range of wireless conditions.

45 Claims, 16 Drawing Sheets

(56) References Cited

U.S. PATENT DOCUMENTS

| | | | |
|---|---|---|---|
| 7,185,256 B2* | 2/2007 | Miki et al. | 714/751 |
| 7,225,385 B2* | 5/2007 | Lin et al. | 714/755 |
| 7,236,740 B2* | 6/2007 | Koo et al. | 455/13.4 |
| 7,292,825 B2* | 11/2007 | Beale et al. | 455/67.11 |
| 7,549,102 B2* | 6/2009 | Murata et al. | 714/748 |
| 7,746,816 B2* | 6/2010 | Attar et al. | 370/318 |
| 7,953,428 B2* | 5/2011 | Shimizu et al. | 455/510 |
| 7,979,768 B2 | 7/2011 | Sammour et al. | |
| 8,050,228 B2 | 11/2011 | Umesh et al. | |
| 8,074,137 B2* | 12/2011 | Terry et al. | 714/748 |
| 8,140,929 B2* | 3/2012 | Kim et al. | 714/749 |
| 8,171,362 B2* | 5/2012 | Grovlen | 714/748 |
| 8,225,162 B2* | 7/2012 | Kumar | 714/748 |
| 8,415,127 B2* | 4/2013 | Ching et al. | 435/190 |
| 8,494,572 B2* | 7/2013 | Chen et al. | 455/522 |
| 8,625,505 B2* | 1/2014 | Haartsen | 370/329 |
| 8,644,226 B2* | 2/2014 | Wengerter et al. | 370/329 |
| 2001/0056560 A1* | 12/2001 | Khan et al. | 714/746 |
| 2002/0049068 A1* | 4/2002 | Koo et al. | 455/522 |
| 2003/0210668 A1* | 11/2003 | Malladi et al. | 370/335 |
| 2005/0226182 A1* | 10/2005 | Itoh | 370/329 |
| 2005/0249120 A1* | 11/2005 | Heo et al. | 370/236 |
| 2006/0146762 A1* | 7/2006 | Kuroda et al. | 370/335 |
| 2007/0024559 A1* | 2/2007 | Ahn et al. | 345/89 |
| 2007/0041349 A1* | 2/2007 | Kim et al. | 370/335 |
| 2007/0173275 A1* | 7/2007 | Das et al. | 455/522 |
| 2008/0080424 A1* | 4/2008 | Torsner et al. | 370/330 |
| 2008/0108380 A1 | 5/2008 | Tokita | |
| 2008/0137689 A1 | 6/2008 | Shiizaki et al. | |
| 2009/0022098 A1* | 1/2009 | Novak et al. | 370/329 |
| 2009/0303944 A1* | 12/2009 | Fukuoka et al. | 370/329 |
| 2010/0067460 A1* | 3/2010 | Hu et al. | 370/329 |

FOREIGN PATENT DOCUMENTS

| | | |
|---|---|---|
| JP | 2008118417 A | 5/2008 |
| JP | 2008172754 A | 7/2008 |
| JP | 2010530709 A | 9/2010 |
| WO | WO2005109729 | 11/2005 |
| WO | WO2006050947 | 5/2006 |
| WO | WO-2007007383 A1 | 1/2007 |
| WO | WO-2008156414 A2 | 12/2008 |

OTHER PUBLICATIONS

Ericsson: "EUL coverage enhancements", 3GPP Draft; R1-081619, 3rd Generation Partnership Project (3GPP), Mobile Competence Centre ; 650, Route Des Lucioles ; F-06921 Sophia-Antipolis Cedex ; France, vol. RAN WG1, no. Shenzhen, China; Apr. 9, 2008, XP050110019, retrieved on Apr. 4, 2008.

International Search Report and Written Opinion—PCT/US2010/039500—International Search Authority, European Patent Office,Feb. 2, 2011.

Partial International Search Report—PCT/US2010/039500—International Search Authority, European Patent Office, Oct. 12, 2010.

Philips: "Feedback of Channel Quality", 3GPP Draft; R2-071391, 3rd Generation Partnership Project (3GPP), Mobile Competence Centre ; 650, Route Des Lucioles ; F-06921 Sophia-Antipolis Cedex ; France, vol. RAN WG2, no. St. Julian; Mar. 22, 2007, XP050134330, [retrieved on Mar. 22, 2007].

Qualcomm Europe: "Principles for the new CELL-PCH/URA-PCH operation" 3GPP Draft; R2-071200, 3rd Generation Partnership Project (3GPP), Mobile Competence Centre ; 650, Route Des Lucioles ; F-06921 Sophia-Antipolis Cedex France, ;ol . RAN WG2, no. S t . Jul i an; Mar. 22, 2007, XP050134173.

Taiwan Search Report—TW099120277—TIPO—Apr. 25, 2013.

* cited by examiner

WIRELESS COMMUNICATION HAVING REDUCED FEEDBACK DELAY

CLAIM OF PRIORITY UNDER 35 U.S.C. §119

The present Application for Patent claims priority to Provisional Patent Application Ser. No. 61/219,302 entitled "METHODS OF SENDING DATA PACKETS WITH REDUCED FEEDBACK DELAY" and filed Jun. 22, 2009, assigned to the assignee hereof and hereby expressly incorporated by reference herein.

BACKGROUND

1. Field

The following relates generally to wireless communication, and more specifically to improvements for error correction signaling employed for wireless communication.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Wireless communications can be subject to data loss based on many physical phenomenon, as well as processing errors and other circumstances. For instance, signal interference, thermal noise or other background noise, signal reflection, scattering, and so on, can cause problems for a wireless receiver attempting to properly receive a transmitted signal. In addition to the foregoing, signal decoding at the wireless receiver can also fail to demodulate or decode a subset of information conveyed via the transmitted signal. To correct these problems, error correction protocols can be employed to correct or avoid many known wireless communication errors. Examples can include employing decoding techniques that mitigate physical channel distortions, switching to less distorted physical channels, re-transmitting a subset of unreceived or improperly decoded information, negotiating reserved wireless resources with interfering transmitters, and so on, or suitable combinations thereof.

One technique for error correction in wireless communication involves repeat request signalling. According to this mechanism, a wireless transmitter schedules transmissions to be sent to a wireless receiver. The wireless receiver acknowledges properly received transmissions or sends a negative acknowledgment, or sends no data, for improperly received transmissions. In the case of improperly received transmissions, the wireless transmitter re-transmits a subset of data until an acknowledgment for that data is received. This error correction mechanism can help to improve overall accuracy of wireless communications, though inherent delays can result from multiple transmissions of data. A need exists, therefore, to improve accuracy in wireless communication while mitigating overhead or mitigating delay resulting from error correction techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects of the subject disclosure provide for improved repeat request signaling in wireless communications. For instance, in hybrid automatic repeat request (HARQ) protocols, multiple transmissions can be conducted for a HARQ process in a manner that causes a receiving device to combine the multiple transmissions, rather than treat them as separate transmissions. In this manner, multiple transmissions can be employed to increase overall receive energy, without violating maximum transmit power constraints in a wireless communication. Further, these multiple transmissions can be scheduled prior to a minimum separation time in conventional HARQ protocols, thereby reducing delay for repeat request signaling.

According to a particular aspect of the subject disclosure, multiple transmissions received within a response time (before a response is scheduled for a transmission at time N) are combined by a wireless receiver, and acknowledged with a feedback signal. Furthermore, one or more control signals can be sent within the response time, having a duration that is signaled to the wireless receiver. In at least one aspect, a redundancy version for transmissions subject to a particular control transmission(s) can be derived from a deterministic function based on a known quantity or identifier, or derived from an implicit mapping function known to the wireless receiver. In this manner, an amount of control overhead for the wireless communication can be flexibly controlled to accommodate various constraints.

In one aspect of the subject disclosure, provided is a method for wireless communication. The method can comprise transmitting a control signal and a data signal in a HARQ process to a user equipment (a UE). Additionally, the method can comprise re-transmitting the data signal or the control signal to the UE prior to a UE response time of the HARQ process.

In further aspects disclosed herein, provided is an apparatus for wireless communication. The apparatus can comprise a communication interface for employing a wireless transceiver to exchange wireless signals with a UE. Further, the apparatus can comprise a memory for storing instructions to provide reduced delay for HARQ signals in a wireless communication, and a data processor for executing modules that implement the instructions. Particularly, the modules can comprise a control module that establishes re-transmission timing for control or data signals of a HARQ process, and a transmission module that employs the re-transmission timing to transmit and then re-transmit a control signal or a data signal for the HARQ process in less than a minimum separation time of the HARQ process.

In one or more additional aspects, provided is an apparatus for wireless communication. The apparatus can comprise means for transmitting a control signal and a data signal in a HARQ process to a UE. Moreover, the apparatus can also comprise means for re-transmitting the data signal or the control signal to the UE prior to a UE response time of the HARQ process.

According to another aspect, disclosed is at least one processor configured for wireless communication. The processor(s) can comprise a first module that transmits a control signal and a data signal in a HARQ process to a UE. Furthermore, the processor(s) can also comprise a second module that re-transmits the data signal or the control signal to the UE prior to a UE response time of the HARQ process.

Additional aspects of the subject disclosure provide for a computer program product comprising a computer-readable medium. The computer-readable medium can comprise a first set of codes for causing a computer to transmit a control signal and a data signal in a HARQ process to a UE. Furthermore, the computer-readable medium can also comprise a second set of codes for causing the computer to re-transmit the data signal or the control signal to the UE prior to a UE response time of the HARQ process.

In addition to the foregoing, the subject disclosure provides a method for wireless communication. The method can comprise receiving a data transmission on a signal time slot of a HARQ process. Further, the method can comprise receiving a subsequent data transmission on a subsequent signal time slot of the HARQ process. The method can also comprise decoding a combination of the data transmission and the subsequent data transmission prior to transmitting a feedback signal in response to the data transmission.

In at least one additional aspect of the subject disclosure, provided is an apparatus for wireless communication. The apparatus can comprise a communication interface for exchanging wireless signals with a base station. Additionally, the apparatus can comprise a memory for storing instructions configured to provide HARQ functions for a wireless communication and a data processor for executing modules to implement the instructions. Particularly, the modules can comprise a buffering module that obtains multiple data signals received by the communication interface within a feedback response window of a HARQ process. Furthermore, the modules can also comprise an analysis module that combines the multiple data signals for decoding at the communication interface if a receive energy of at least one signal of the multiple data signals is below a target signal to noise ratio level (a target SNR level).

In yet other aspects disclosed herein, the subject disclosure provides an apparatus for wireless communication. The apparatus can comprise means for receiving a data transmission on a signal time slot of a HARQ process. Further, the apparatus can comprise means for receiving a subsequent data transmission on a subsequent signal time slot of the HARQ process. In addition to the foregoing, the apparatus can comprise means for decoding a combination of the data transmission and the subsequent data transmission prior to transmitting a feedback signal in response to the data transmission.

In another aspect, disclosed is at least one processor configured for wireless communication. The processor(s) can comprise a first module for receiving a data transmission on a signal time slot of a HARQ process. In addition, the processor(s) can comprise a second module for receiving a subsequent data transmission on a subsequent signal time slot of the HARQ process. Moreover, the processor(s) can comprise a third module for decoding a combination of the data transmission and the subsequent data transmission prior to transmitting a feedback signal in response to the data transmission.

In at least one other aspect of the subject disclosure, provided is a computer program product comprising a computer-readable medium. The computer-readable medium can comprise a first set of codes for causing a computer to receive a data transmission on a signal time slot of a HARQ process. Additionally, the computer-readable medium can comprise a second set of codes for causing the computer to receive a subsequent data transmission on a subsequent signal time slot of the HARQ process. Further to the above, the computer-readable medium can comprise a third set of codes for causing the computer to decode a combination of the data transmission and the subsequent data transmission prior to transmitting a feedback signal in response to the data transmission.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
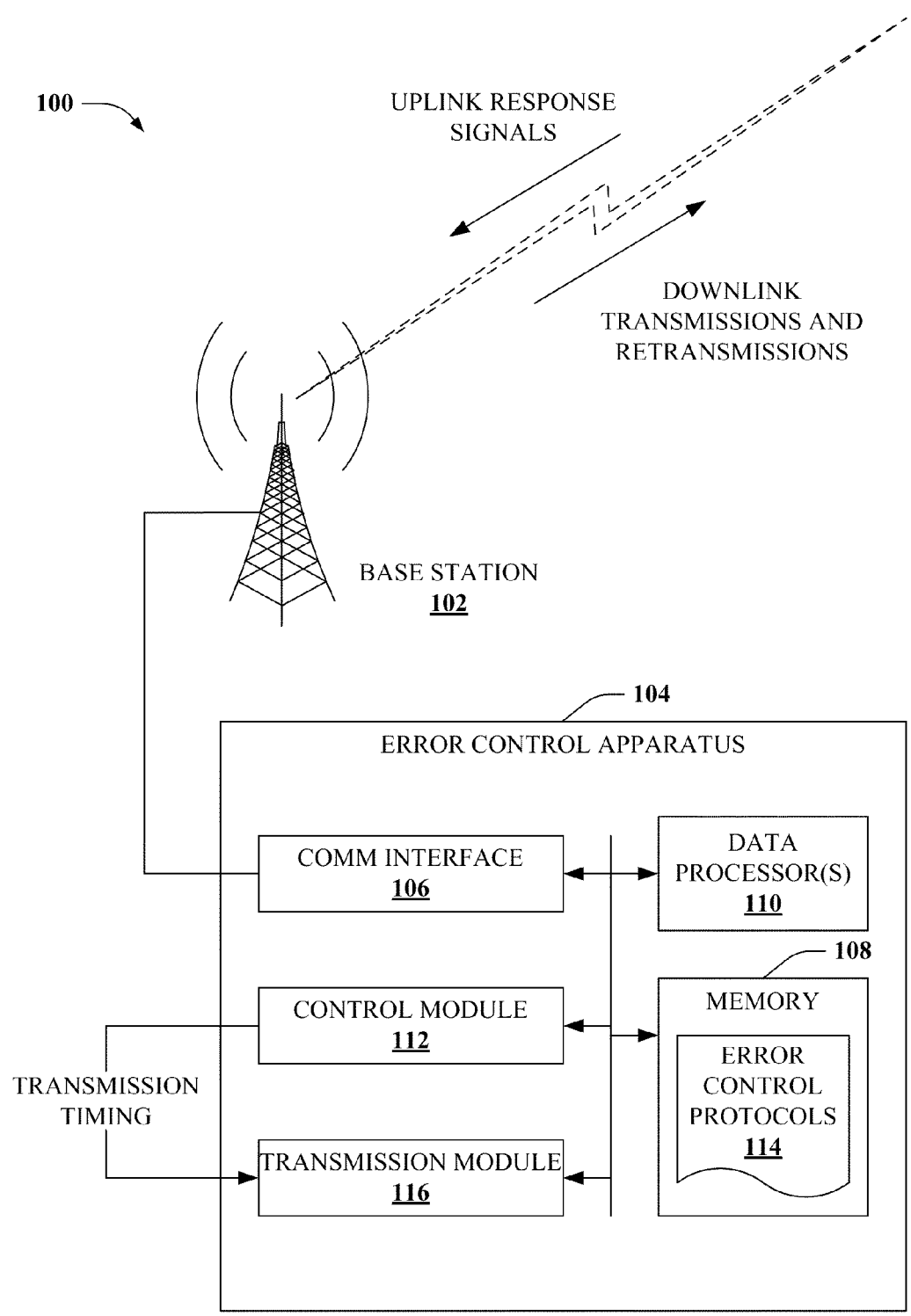
FIG. 1 illustrates a block diagram of an example apparatus that provides error control signaling for wireless communication according to disclosed aspects.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing reduced delay for automatic repeat request (ARQ) and hybrid ARQ (HARQ) signaling in wireless communication, among other things. One skilled in the art should appreciate that similar techniques could apply to other communication environments.

Conventional ARQ signaling relates to protocols employed to increase reliability and reduce data loss for wireless communication. In ARQ signaling, a data transmission sent by a wireless transmitter, whether uplink or downlink, is linked with an acknowledgment (an ACK), and a timeout period. In this context, an ACK is a message sent by a wireless receiver indicating that a data frame or data packet of the data transmission is properly received and decoded by the wireless receiver. The timeout period is a period of time (often measured in signal subframes, signal subslots, or other suitable time based subdivisions of a wireless channel) between a transmitter initiating a data transmission and a receiver initiating a feedback signal (e.g., an ACK or a NACK) in response to that data transmission. If the transmitter does not receive an ACK in response to a data transmission within a specified timeout period, the wireless transmitter generally re-transmits the data transmission (with one or more separate signals). In contrast, if the ACK is received within the timeout period the wireless transceiver can move on to schedule a different data transmission. In some cases, the wireless receiver can transmit a negative acknowledgment (a NACK) indicating that the data packet or a subset thereof is not properly received, to cause the wireless transmitter to re-transmit the data packet or subset thereof.

Conventional HARQ signaling is similar to ARQ signaling, but can add forward error correction data to a data transmission under conditions specified for a type of HARQ protocol (e.g., Type I HARQ, Type II HARQ). The forward error correction data can be employed by a receiver to correct decoding errors with fewer or no signal re-transmissions. Where the forward error correction data is insufficient to properly decode a signal, the receiver can send a NACK, or refrain from sending an ACK, to cause a transmitter to re-transmit the data transmission (or a subset thereof).

One common mode for implementing HARQ error correction is called a stop-and-wait mode (a SAW mode). According to the SAW mode, a transmitter sends a signal, and then waits for a feedback signal in response to the signal (e.g., an ACK) before transmitting a subsequent signal. Characteristics of the SAW mode include a very low error rate and packet loss, at the expense of lower data rates. Because data packets are re-transmitted until properly received and acknowledged, packet loss is very minimal. However, because subsequent signals are queued until prior signals are handled, rate of transmission of groups of data packets is relatively slow, particularly for a poor quality wireless channel observing high interference.

A variation of the SAW mode HARQ error correction employs multiple HARQ SAW modes, or multiple HARQ processes employed in parallel. As utilized herein, a HARQ process is a single SAW mode implemented in conjunction with at least one other SAW mode (e.g., third generation partnership project long term evolution [3GPP LTE] employs a maximum of eight HARQ processes). The HARQ process is generally characterized by a transmission window and a response time, and one or more re-transmission windows if needed. The transmission window has a size in units of time (e.g., one milliseconds, eight milliseconds, or any other suitable amount of time), or alternatively in units of an amount of data (e.g., 128 bytes, 512 bytes, 32 kilobytes, and so on). In some communication systems, the transmission window can be a fixed size; although in other communication systems, the transmission window can be a variable size (e.g., specified by a network entity, or by a client device, and can be based on various dynamic factors including a type of traffic, an application requirement or specification, a manual data entry, a target data rate, a target bandwidth, a target quality of service, prevailing interference, a signal to noise ratio [a SNR], and so on, or on static factors such as characteristics of a wireless cell, characteristics of a surrounding geography, and so on). As utilized herein, a transmission time interval (a TTI) refers to a transmission window measured in units of time; however, it should be appreciated that the subject disclosure is not so limited and a TTI measured in units of data could be interchanged with the TTI measured in units of time where suitable.

A response time is generally a fixed number of TTIs after an initial transmission of a signal (where the initial transmission is not a re-transmission of a HARQ process), but can also include a fixed number of other signal time divisions (e.g., subframes, subslots) or other suitable metrics of time (e.g., milliseconds, microseconds, and so on). Thus, as one example for illustrative purposes, if an initial transmission is sent at a TTI N (where N is a non-negative integer), a response time of 5 implies that a feedback signal is sent in response to the initial transmission after 5 subsequent TTIs, or at TTI N+5 assuming sequentially numbered TTIs. Accordingly, in the multiple SAW mode, a transmitter can expect to receive a feedback signal in response to a transmission on a particular HARQ process at a point in time defined by the TTI of initial transmission plus the response time. If a feedback signal is not received in the expected response time (or if a NACK is received), the transmission or a subset thereof is re-transmitted in one or more re-transmission windows, which can be a fixed time after the response time, or a variable time after the response time. (Additionally, the one or more re-transmission windows can be on different frequency resources or different signal dimensions).

Where re-transmitted signals associated with an initial signal occur on fixed signal resources (e.g., fixed time-frequency resources, fixed modulation/spreading/scrambling codes, a fixed number of multiple input multiple output [MIMO] streams, and so on), no additional control signaling is required for a HARQ process assigned to these signals. Thus, fixed re-transmissions minimize control overhead of the HARQ process. However, systems that employ variable signal resources for re-transmissions can lead to greater flexibility and often improved data rates, interference mitigation, and the like, for a set of user equipments (a set of UEs). In this case, additional control signals can be employed to instruct a receiver how to receive and decode re-transmissions that are not on fixed signal resources. These additional control signals can include an identifier for the HARQ process, enabling the receiver to apply instructions included in the additional control signals to re-transmissions of the initial signal.

In some cases, re-transmissions on a HARQ process can be full re-transmissions of an initial signal, or incremental re-transmissions. In the former case, the initial signal is simply repeated at a fixed or variable re-transmission window, until an ACK is received from a receiver. In the latter case, subsets of the initial signal are sent in a sequence defined by a redundancy version of the respective subsets. The incremental re-transmission is referred to as incremental redundancy, and can reduce re-transmission overhead in certain wireless conditions, particularly when a portion of the initial signal is improperly decoded at the receiver, and fewer than all subsets of the initial signal are needed by the receiver to properly decode the initial signal. For incremental redundancy re-transmissions, the transmitter resends a first subset of the initial signal, and waits for a response from the receiver on that HARQ process. If the receiver acknowledges proper receipt and decoding of the initial signal after the first subset, the HARQ process can proceed to another initial transmission. Otherwise, a second subset of the initial signal is transmitted by the transmitter, which waits for a response on the HARQ process, and so on, until a feedback signal indicating proper receipt is obtained.

Generally in wireless communication systems, a control signal is transmitted along with an initial data signal on a HARQ process. A user equipment (a UE) receives and decodes the control signal to determine whether a particular signal time slot includes a data signal pertinent to the UE, what signal resources the data signal is transmitted on, and how to decode the data signal. In various HARQ implementations, a transmitter can be constrained by a minimum separation time between two transmissions on each individual HARQ process, often requiring transmissions on multiple other HARQ processes to be completed before re-transmissions on individual HARQ processes can be implemented. This delay can be exacerbated for a receiving device that is at an edge of a cell boundary, for instance, where the initial signal is received with a low SNR. This can introduce significant delay in delivering a decodable signal, particularly where transmitters are constrained to a maximum transmit power, and achieving a target SNR at the receiver involves multiple re-transmissions of the initial signal.

Referring now to the figures, FIG. 1 illustrates a block diagram of an example wireless communication apparatus 100 that provides error correction for wireless communications according to aspects of the subject disclosure. Particularly, wireless communication apparatus 100 comprises a base station 102 associated with a wireless network (not depicted) that is configured to act as a wireless access point to the wireless network. Further, base station 102 is coupled with an error control apparatus 104 that is configured to mitigate packet loss for wireless communication between base station 102 and a user equipment (a UE—not depicted). According to particular aspects of the subject disclosure, error control apparatus 104 can mitigate delay in automatic repeat request (ARQ) or hybrid ARQ (HARQ) signaling, compared with conventional ARQ or HARQ protocols.

HARQ signaling provides a mechanism for controlling transmission or reception errors in wireless communication. Although HARQ can be employed for different wireless system protocols, basic functionality includes sending acknowledgment (ACK) or negative acknowledgment (NACK) communication in response to wireless transmissions, to assist a transmitting device in re-transmitting lost data as described above and elsewhere herein. On a downlink, base station 102 transmits an initial signal to a UE (not depicted) wirelessly coupled with base station 102. According to some aspects of the subject disclosure, base station 102 transmits only a single initial signal to the UE within a response time for each separate HARQ process. In these aspects, if base station 102 does not obtain a feedback signal within the response time, the initial signal is re-transmitted by base station 102. In these aspects, base station 102 can provide high reliability for wireless communication with the UE, at a cost of re-transmission delay associated with the response time. This can result in significantly lower data rates in a high packet loss environment, or where multiple transmissions of the initial signal are required for the UE to observe a suitable receive energy to decode the initial signal (e.g., where a power constraints governs transmissions of the HARQ process).

To alleviate problems involved in feedback signaling delay (e.g., HARQ or ARQ minimum transmit delays), base station 102 is coupled with an error control apparatus 104 that provides for multiple transmissions of a signal within a response time of a HARQ process. As utilized herein, a response time of a HARQ process is defined as an amount of time between initiating a wireless signal, and a time that a receiving device is scheduled to send a response to the wireless signal (or fail to respond for discontinuous transmission systems). Multiple signal transmissions within such a response time can enable the receiving device to combine the multiple transmissions, increasing SNR, before expiration of a single response time. Further, by transmitting and re-transmitting a signal within the response time, a single uplink response can be sent for the signal, maintaining minimal overhead for uplink feedback channels. In addition, various mechanisms are provided to control multiple transmissions within the response time, as is described in more detail below. By way of various aspects of the subject disclosure, improved accuracy can be provided in wireless communications, while reducing delay associated with conventional error correction techniques.

Error control apparatus 104 comprises a communication interface 106 that is configured for employing a wireless transceiver (e.g., of base station 102) to exchange wireless signals with the UE. In addition, error control apparatus 104 comprises a memory 108 for storing error control protocols 114 to provide reduced delay for error control signals (e.g., HARQ signals, ARQ signals, or the like) in a wireless communication, and a data processor 110 for executing modules that implement the error control protocols 114. Particularly, error control apparatus 104 can comprise a control module that establishes re-transmission timing for control or data signals of a HARQ process. In addition, error control apparatus 104 can comprise a transmission module 116 that employs the re-transmission timing to transmit and then re-transmit a control signal or a data signal for the HARQ process in less than a minimum separation time of the HARQ process. The transmission and re-transmission can increase receive power at the UE within the minimum separation time, to achieve a target SNR level without exceeding a power constraint for individual signals, for instance. In at least one aspect, transmission module 116 can re-transmit the control signal or the data signal multiple times within the minimum separation time, to further increase the target SNR level of such signal.

In one aspect of the subject disclosure, the minimum separation time is a response time that defines a response period between initiating a downlink transmission on the HARQ process and initiation of an uplink ACK or NACK transmission by the UE. In another instance, the minimum separation time is a multiple of the response time, such as two times the response time, three times the response time, and so on. Depending on various factors, transmission module 116 can establish transmission and re-transmission of the control signal or the data signal in consecutive subframes or non-consecutive subframes. Such factors can include processing speed of the UE, a number of TTIs established for the minimum separation time, or the like. It should be appreciated that the control signal can include decoding information for one or more of these TTIs, or for subsequent TTIs the HARQ process outside of the minimum separation time. Accordingly, in at least some aspects of the subject disclosure, transmission module 116 further transmits to the UE a duration of TTIs over which the control signal is valid. In this case, control module 112 can specify one or more mechanisms for conveying the duration of TTIs to the UE. In one particular example, control module 112 establishes a system information block (SIB) transmission, a radio resource control (RRC) transmission, or a physical downlink control channel (PDCCH) transmission for transmitting the duration of TTIs to the UE, which is then employed by the transmission module 116. It should be appreciated, however, that other broadcast or unicast channels can be employed for various wireless communication systems.

According to further aspects of the subject disclosure, re-transmission of the control signal or the data signal can be simultaneous (e.g., a single re-transmission of the entire signal) or incremental. In the latter case, control module 112 employs a mapping function to specify a redundancy version (a RV) for respective TTIs within the duration of TTIs. In this manner, incremental transmissions can be linked with different TTIs by respective RVs. The mapping function can specify RV for respective TTIs in various suitable manners. In one example, control module 112 establishes a deterministic relationship between a RV and an identifier of the UE, a cell identifier or a subframe number, or a like deterministic quantity, or a suitable combination thereof. This deterministic relationship can be established for respective TTIs within the duration of TTIs. In another example, control module 112 can generate an independent control message that explicitly associates respective RVs and TTIs, or such association can be included in the initial control signal sent by transmission module 116, above.

Although the control signal can include information for the duration of TTIs, additional control signaling can also be performed by base station 102 within this duration of TTIs. In this case, transmission module 116 sends a payload of a second control signal within the duration of TTIs. The second control signal can be applicable to the control signal or data signal or re-transmissions thereof, to other control or data signals on the HARQ process, or to control or data signals of another HARQ process employed in wireless communication between base station 102 and the UE. A number of control signals transmitted within a particular duration of TTIs can be limited based on control overhead constraints, or can be dynamically configured based on varying circumstances (e.g., cell loading, inter-cell interference, and so on) that impact control overhead preferences defined in error control protocols 114.

Figure 2:
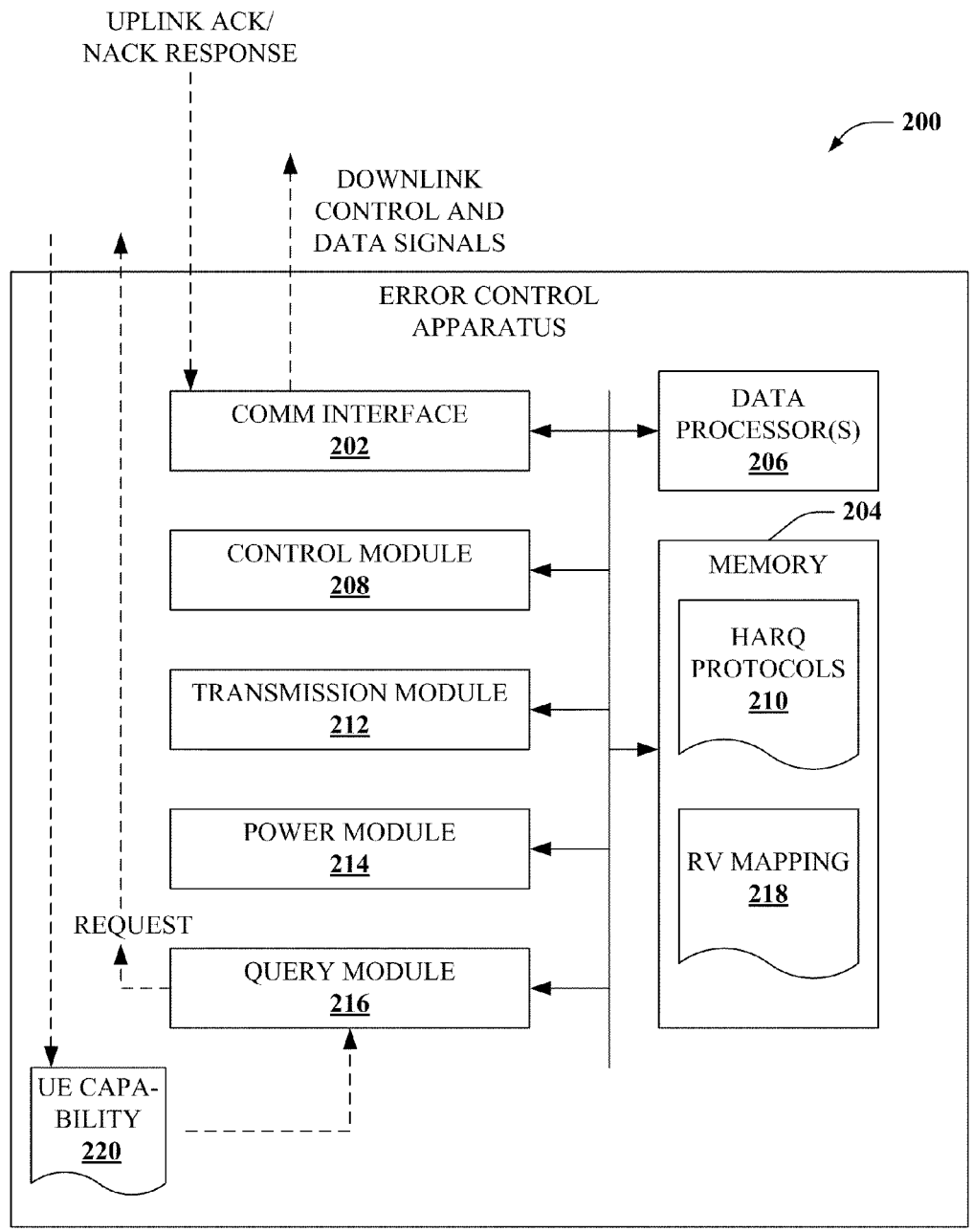
FIG. 2 depicts a block diagram of a sample apparatus that provides hybrid automatic repeat request (HARQ) functionality for wireless communication.

FIG. 2 illustrates an error control apparatus 200 according to additional aspects of the subject disclosure. Error control apparatus 200 can be substantially similar to error control apparatus 104 in some aspects of the subject disclosure, however, the disclosure is no so limited. For instance, error control apparatus 200 can comprise some or all functionality of error control apparatus 200, as well as additional functionality described below, or suitable combinations thereof. In various implementations, error control apparatus 200 can achieve reduced delay for error control signaling in wireless communications by performing one or more signal re-transmissions within a single response time of a HARQ process. These re-transmissions can potentially reduce control overhead for that HARQ process, and achieve increased SNR levels at a receiving device while mitigating a conventional delay of several TTIs between signal re-transmissions.

As depicted, error control apparatus 200 can comprise a communication interface 202 for exchanging wireless signals with a UE. In one aspect, communication interface 202 comprises a wireless transceiver device, and in another aspect, communication interface 202 instead employs a wireless transceiver of a base station (not depicted) for exchanging the wireless signals. Additionally, error control apparatus 200 can comprise memory 204 for storing modules or instructions configured to conduct error control signaling, and a data processor 206 for implementing the modules.

Particularly, error control apparatus 200 can comprise a control module 208 that establish a re-transmission timing for control or data signals of a HARQ process. The re-transmission timing can be measured in a number of TTIs, however the subject disclosure is not so limited. In one example for HARQ error control signaling, control module 208 employs HARQ protocols 210 stored in memory 204 and identifies a number of TTIs between transmission of a signal and a scheduled ACK/NACK response to that signal (e.g., a number of TTIs within a single response time for a HARQ process, see FIGS. 3 and 4, infra). For purposes of this example, assume the number of TTIs is X, where X is a positive integer greater than zero (e.g., in 3GPP LTE Release 8 a response time includes X=4 TTIs, and a minimum transmission time on the HARQ process is eight TTIs). Accordingly, control module 208 establishes between zero and X−1 TTIs between transmission and re-transmission of a signal. For zero TTIs, a signal is transmitted and re-transmitted in subsequent TTIs. Where one TTI is selected, the signal is transmitted in first TTI, followed by a TTI with no transmission for the HARQ process, and the re-transmission occurs in a third TTI of the HARQ process, and so on. Selection of the re-transmission time can be based on various factors, which can include a number of re-transmissions required to meet a target SNR level at the receiver, processing speed of a receiving device, the total number of TTIs, X, of a response time for the HARQ process, or the like, or a suitable combination thereof.

To obtain UE-specific information for determining the re-transmission time, error control apparatus 200 can analyze downlink signal measurements provided by a receiving device. For instance, a measured receive energy of signals received from error control apparatus 200 (or a base station coupled thereto) can be transmitted by the receiving device according to wireless communication protocols. A power module 214 can be employed that identifies a transmit power constraint for wireless communication with the receiving device, and a target receive energy of the UE. This measured receive energy can be compared to the target receive energy, enabling power module 214 to determine a number of transmissions required to achieve the target receive energy consistent with the transmit power constraint (e.g., see FIG. 4, infra). In this case, power module 214 instructs a transmission module 212 to re-transmit a signal a number of times sufficient to increase receive energy of the signal up to the target receive energy. Alternatively, or in addition, a query module 216 can be employed to query the receiving device for the measured receive energy, which transmits the measured receive energy in response. Furthermore, query module 216 can be employed to query the receiving device for processing capability of the receiving device (e.g., processing speed, or a similar characteristic). This processing speed can be utilized in conjunction with the number of transmissions required to achieve the target receive energy, and the number of TTIs in a HARQ process response time, to determine a suitable re-transmission time, discussed above.

It should be appreciated that error control apparatus 200 can be employed for legacy UEs, in addition to UEs that are specifically configured to process multiple transmissions within the response time of a single HARQ process. In the former case, for instance, transmission module 212 sends an instruction to the legacy UE indicating that multiple control or data transmissions, respectively, received within the minimum separation time of the HARQ process are to be treated as re-transmitted signals. Thus, these signals are combined by the legacy UE to increase receive energy of respective transmissions.

As described herein, a re-transmission of a signal can be transmitted in a single TTI and combined at the receiving device, or subsets of the re-transmitted signal can be sent in separate TTIs (per the re-transmission timing) according to an incremental redundancy policy. Respective subsets of the re-transmitted signal can include a RV indicator that identifies respective subsets of the re-transmitted signal. To reduce a number of bits required for the RV indicator, a mapping function can be employed based on RV mapping 218 stored in memory 204. RV mapping 218 can comprise a single bit in conjunction with a TTI in which a subset is transmitted, to imply two indicators per TTI. In another example, RV mapping 218 can provide a deterministic relationship between quantities known to the receiving device (e.g., a cell identifier, a UE identifier, a subframe or TTI number in which the subset is transmitted, or the like) and one or more bit values transmitted with the subset transmission to identify an RV for the subset. Other mapping mechanisms known by one skilled in wireless communication can be employed as well.

Figure 3:
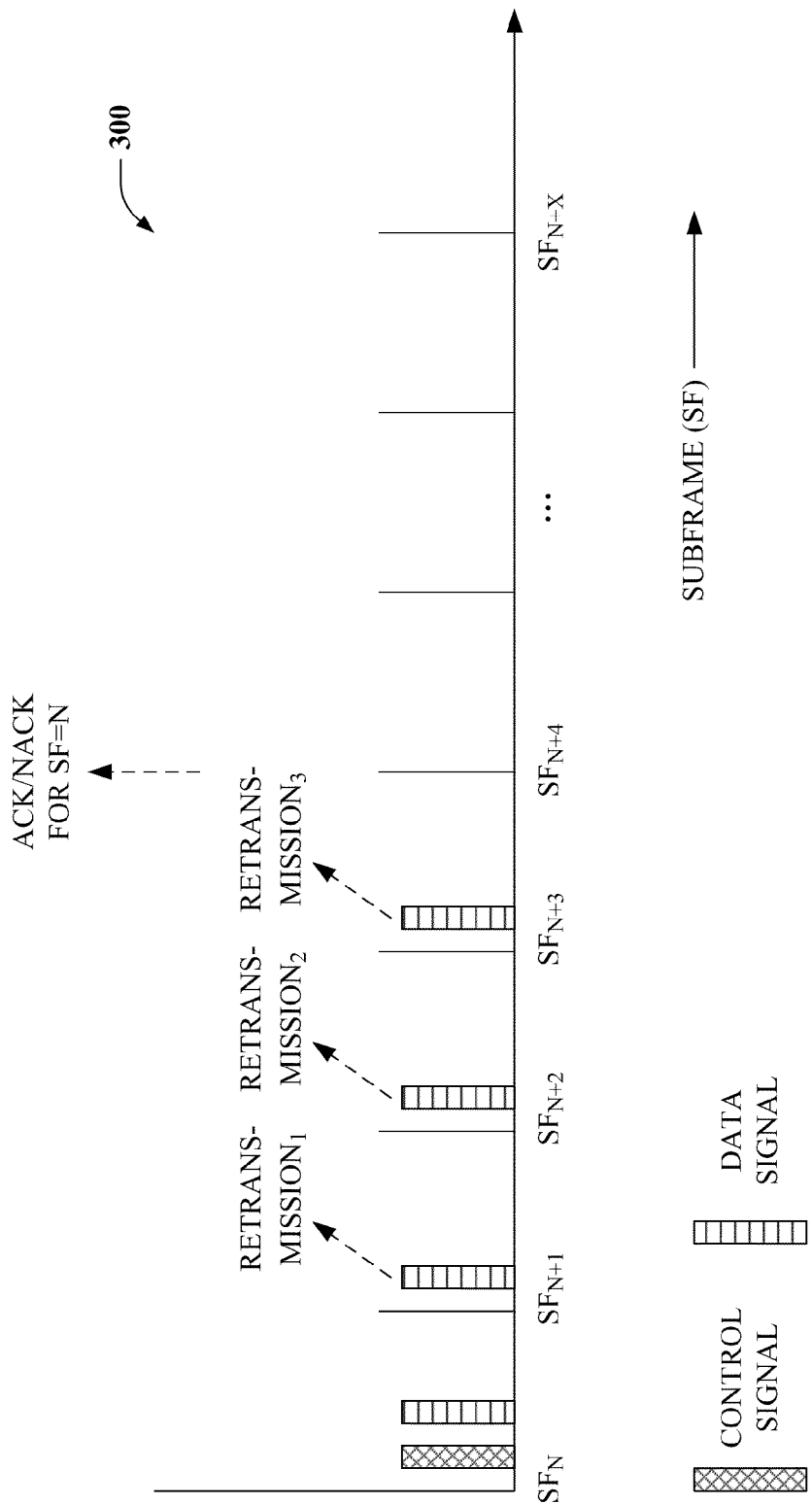
FIG. 3 illustrates a block diagram of an example wireless signal diagram that illustrates various aspects disclosed herein.

FIG. 3 illustrates a diagram of an example wireless channel 300 configured for HARQ signaling according to various aspects of the subject disclosure. Wireless channel 300 comprises a set of subframes in a time dimension along the horizontal axis. On the left side of the horizontal axis is an $N^{th}$ subframe, $SF_N$, where N is a non-negative integer, followed by $SB_{N+1}$, $SB_{N+2}$, and so on, up through $SB_{N+X}$ at the right side of the horizontal axis, where X is an integer greater than four in the depicted example.

Wireless channel 300 employs HARQ error signaling for error correction and feedback signaling. In this context, each subframe is a TTI for a separate HARQ process, although a TTI can instead be only a portion of a subframe, or multiple subframes in various possible implementations. This example also comprises a total of eight independent HARQ processes, each having a TTI duration of one subframe, with feedback scheduling for each HARQ process scheduled four subframes after that HARQ process. Particularly, $SF_N$ comprises a control transmission (cross-hatch fill) and a data transmission (parallel line fill). It is assumed that this data transmission is a downlink transmission for purposes of the following example, however it should be appreciated that wireless channel 300 can be configured for uplink data transmission and downlink feedback (e.g., ACK, NACK, discontinuous transmission, etc.), where data transmissions are sent on an uplink and control transmissions are control grants transmitted on a downlink prior to respective data transmissions. Feedback signaling for a particular transmission is scheduled four subframes after that transmission. For the downlink example, the control transmission and data transmission sent at $SF_N$ correspond to a feedback signal scheduled at $SF_{N+4}$.

In conventional ARQ and HARQ implementations, a transmission in $SF_N$ is scheduled to be ACKed in a subsequent subframe (e.g., $SF_{N+4}$), and re-transmissions of that transmission follow the subsequent subframe. This introduces an inherent delay in transmitting and re-transmitting a signal, called a minimum separation time between two transmissions on a given HARQ process. Specifically, a minimum separation time comprises a number of TTIs between transmission at $SF_N$ and acknowledgment at $SF_{N+4}$, in addition to a number of TTIs between acknowledgment at $SF_{N+4}$ and a scheduled re-transmission. In some HARQ systems, the earliest scheduled re-transmission occurs at $SF_{N+8}$ (for a minimum separation time of eight TTIs); however, other HARQ systems enable dynamic time-based scheduling in conjunction with additional control signaling, allowing a re-transmission at $SF_{N+5}$. In either case, the earliest a single re-transmission can occur is five TTIs after an initial transmission. Where multiple re-transmissions are required, the multiples of the minimum separation time can be required for a single transmission to be properly received and acknowledged by a receiving device, introducing significant delay in the HARQ process.

In contrast to conventional systems, the subject disclosure enables re-transmission of an initial signal prior to a conventional minimum separation time. Thus, a signal can be initially transmitted in a first TTI (e.g., subframe $SF_N$) and then immediately re-transmitted in the next TTI following the first TTI (e.g., subframe $SF_{N+1}$). Furthermore, the signal can be re-transmitted in any TTI up to the minimum separation time. In at least one aspect, the signal is re-transmitted in one or more TTIs up to but not including a TTI in which feedback is scheduled for the initial transmission (e.g., subframe $SF_{N+4}$). Thus, as depicted by wireless channel 300, an initial data transmission at $SF_N$ can be re-transmitted at $SF_{N+1}$, $SF_{N+2}$, and $SF_{N+3}$, or a suitable subset of those subframes instead.

A device receiving the initial and re-transmitted signals can treat these signals as a single communication to be combined and decoded. In some aspects of the subject disclosure, the receiving device can be pre-configured to treat multiple signals within the minimum separation time, or received prior to a scheduled feedback signal on the HARQ process, as the single communication. In other aspects, the control transmission sent at $SF_N$ can specify a number of independent transmissions to be sent for the single communication, what time-frequency resources those independent transmissions are transmitted on, and how to decode them. In still other aspects, some or all of this information can be conveyed via higher layer signaling, in a system information block (SIB) message, in another suitable unicast message to the receiving device, or the like.

Although only a single control signal is depicted for wireless channel 300, it is to be appreciated that additional control signaling can be performed in subframes $SF_N$ through $SF_{N+3}$. In some aspects, the additional control signaling can pertain to a HARQ process comprising $SF_N$. In other aspects, the additional control signaling can pertain to another HARQ process. In this latter case, the additional control signaling can comprise only a payload of a standard control message, for instance, which can include assignment grants, downlink scheduling, feedback scheduling, or other suitable control signaling for wireless communication. Additionally, it should be appreciated that re-transmissions of the initial data or control signal transmitted at $SF_N$ can be complete re-transmissions or incremental re-transmissions. In the latter case, a RV can be specified for each re-transmission, as described herein.

Figure 4:
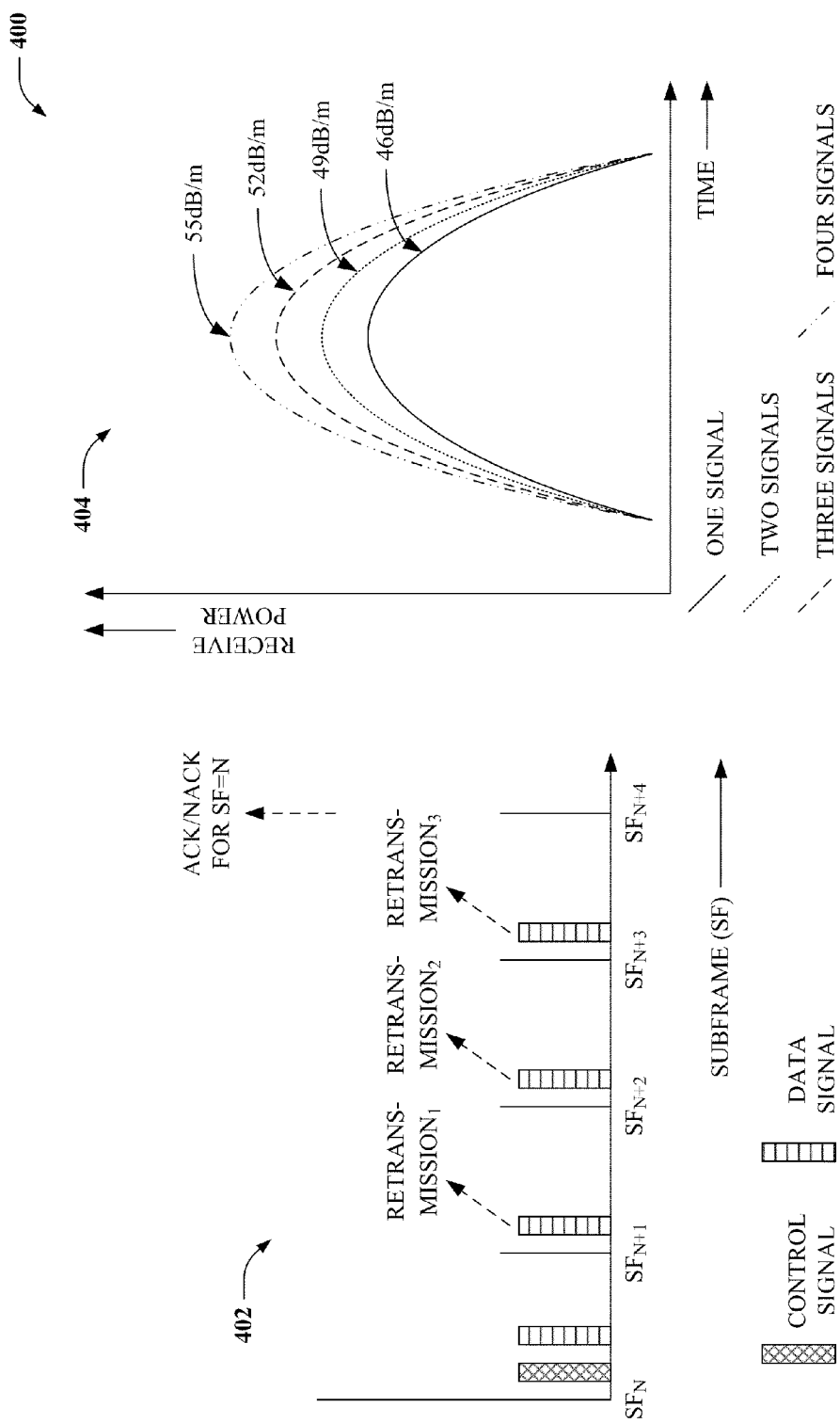
FIG. 4 depicts a block diagram of a sample received power diagram for multiple wireless signals according to particular disclosed aspects.

FIG. 4 illustrates an example diagram 400 of a wireless channel 402 and a receive power graph 404 for received transmissions corresponding to wireless channel 400. Wireless channel 402 comprises five subframes $SF_N$ through $SF_{N+4}$. In addition, wireless channel 402 is arranged such that transmissions on a first HARQ process comprising $SF_N$ are acknowledged at $SF_{N+4}$, transmissions on a second HARQ process comprising $SF_{N+1}$ are acknowledged at $SF_{N+5}$ (not depicted), and so on. It should be appreciated that re-transmissions at $SF_{N+1}$ through $SF_{N+3}$ that are part of the first HARQ process and not the second HARQ or subsequent HARQ processes, however, are not acknowledged at $SF_{N+5}$, and so on, but instead are combined with other transmissions on the first HARQ process and acknowledged as a combination at $SF_{N+4}$.

Receive power graph 404 depicts an illustrative example of different receive powers at a wireless receiving device for combinations of one or more transmissions of a signal. It should be appreciated that the receive power plots of receive power graph 404 are not actual quantitative plots for any wireless receiver, but are intended to illustrate relative changes in receive power as a result of combining multiple transmissions of the signal. It should also be appreciated that transmitted and re-transmitted signals are sent with a constant transmit power, however the subject disclosure is not so limited. For instance, an initial transmission can be sent at a first transmit power, and a re-transmission of the initial signal can be sent at a second transmit power, and so forth. In this case, it is expected that a different receive power would be achieved than that depicted at receive power graph 404, however.

As shown by this example, a single transmission at a constant transmit power is obtained at a receiving device with a receive power of 46 decibels per meter (dB/m). For two transmissions at the same transmit power that are combined at the wireless receiver, the receive power of the combined signals is greater than that of the single signal, and is equal to 49 dB/m in this example. Likewise, for three or four combined transmissions of the signal, the receive power is 52 dB/m and 55 dB/m, respectively. Accordingly, wireless channel 402 and receive power graph 404 illustrate how re-transmitting a signal increases receive power without increasing transmit power of the signals. This can enable communication in a high noise environment (e.g., up to 52 dB/m in this example). In addition, the increased power can be delivered with little delay as compared with conventional re-transmission techniques requiring a minimum separation time between successive re-transmitted signals. Because a re-transmission of an initial signal can occur prior to a scheduled feedback signal for the initial signal, increasing receive power at a wireless receiver by sending multiple signals can be performed in a time comparable with sending a single signal, in many circumstances. This reduced delay for re-transmitted signals can accomplish significant improvements in wireless communications.

Figure 5:
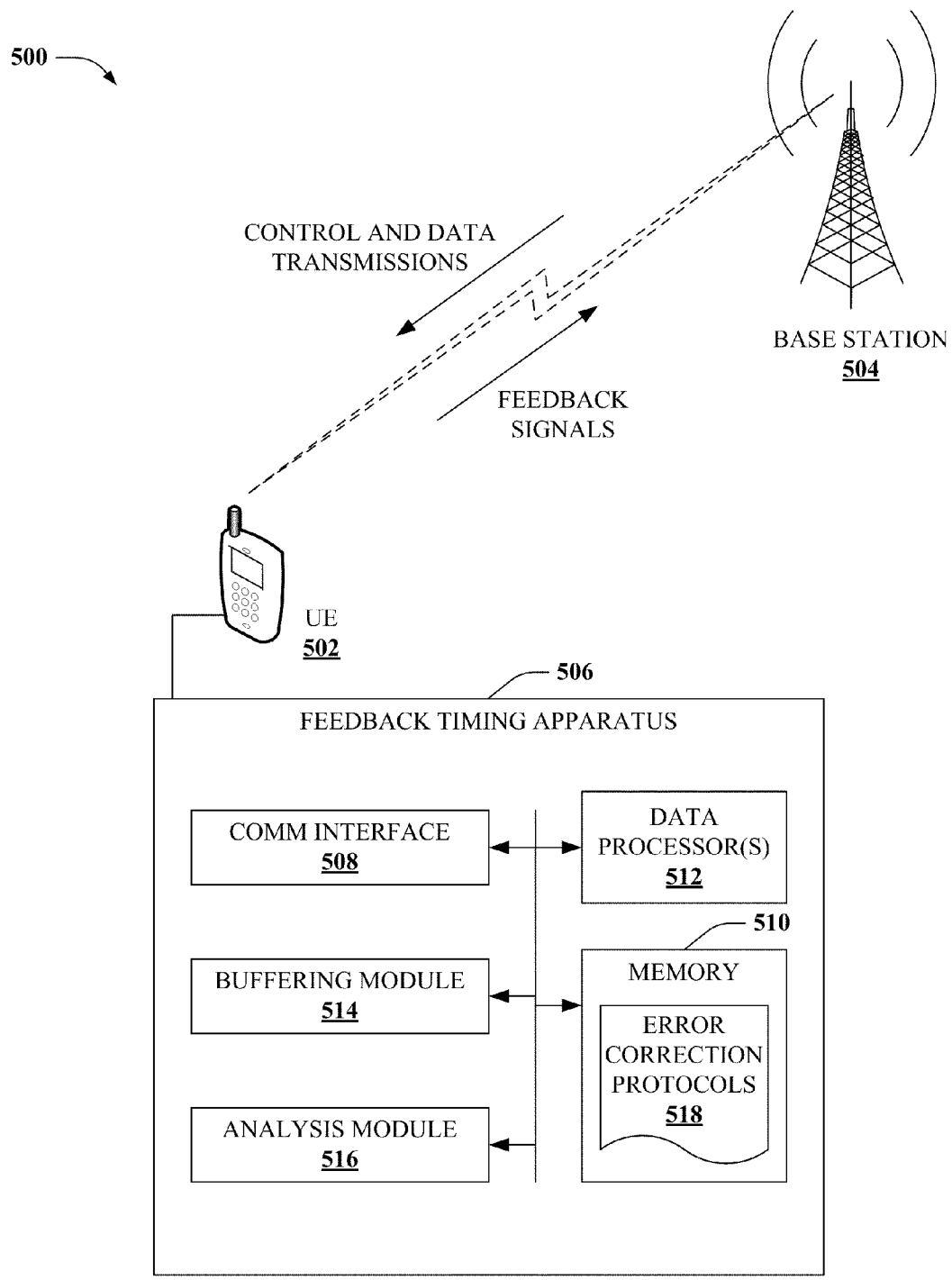
FIG. 5 illustrates a block diagram of a sample apparatus that provides improved feedback signaling for wireless communication.

FIG. 5 illustrates a block diagram of an example wireless communication system 500 according to further aspects of the subject disclosure. Wireless communication system 500 can comprise a user equipment (a UE) 502 wireless coupled with a base station 504 of a wireless network. In addition, UE 502 is coupled with a feedback timing apparatus 506 configured to employ low-delay error correction protocols for wireless communication with base station 504, as described below.

Feedback timing apparatus 506 can comprise a communication interface 508 for exchanging wireless signals with base station 504. Additionally, the apparatus can comprise a memory 510 for storing instructions configured to provide error control functions (e.g., ARQ functions, HARQ functions) for a wireless communication with base station 504, and a data processor 512 for executing modules to implement the instructions. These modules enable UE 502 to reduce delay for acknowledgment signaling as compared with conventional error control functions, as described herein.

Figure 7:
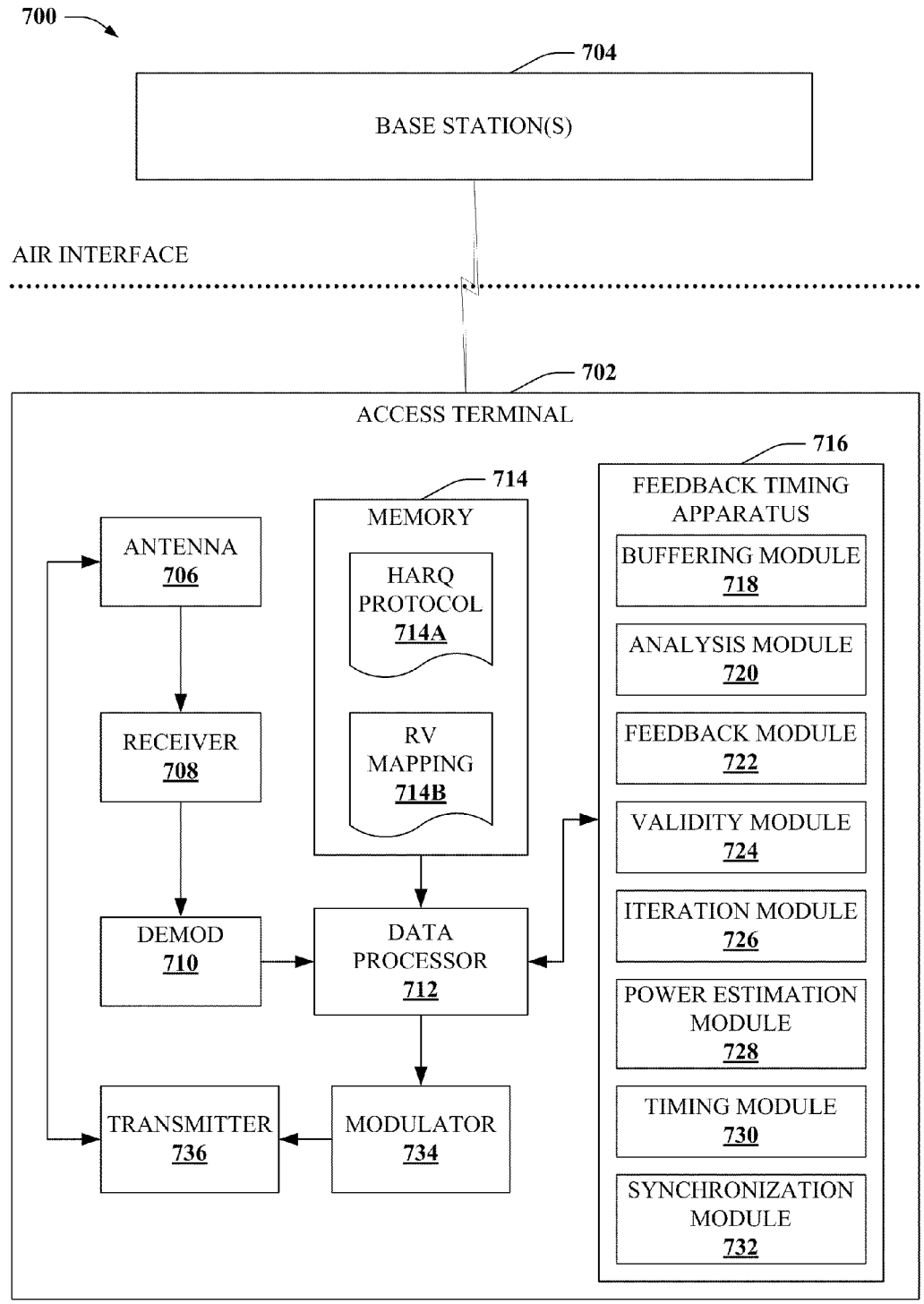
FIG. 7 depicts a block diagram of an example user equipment according to further aspects of the subject disclosure.

According to various disclosed aspects, communication interface 508 can comprise a wireless transceiver, or can employ a wireless transceiver of UE 502 for exchanging wireless signals with base station 504 (e.g., see FIG. 7, supra). To implement error correction functions, feedback timing apparatus 506 can comprise a buffering module 514 that obtains multiple data signals received by communication interface 508 within a feedback response window (e.g., a response time) of a HARQ process. Particularly, these data signals comprise an initial transmission and at least one re-transmission of a control or data signal sent by base station 504. The feedback response window comprises a period of time between receiving the initial transmission and a scheduled acknowledgment response for the initial transmission.

Based on error correction protocols 518 stored in memory 510, an analysis module 516 is employed that combines the multiple data signals for decoding. In one aspect, error control protocols 518 can specify that re-transmissions of a signal (e.g., defined by a different RV for respective transmissions or re-transmissions) received within the feedback response window of a HARQ process are a single communication. In another aspect, analysis module 516 decodes a control channel instruction that contains information on locating and decoding the multiple data signals, or re-transmissions thereof. In this latter aspect, the control channel instruction can further specify a number of the data signals to be combined for decoding.

Multiple signals combined by analysis module 516 can serve to increase an effective receive energy of the single communication. Optionally, combining the multiple data signals can be conditioned on whether a receive energy of at least one signal of the multiple data signals is below a target SNR level. Further, a number of the multiple data signals that are combined can also be conditioned on a degree that the at least one signal is below the target SNR level. Accordingly, two transmissions can be combined for low divergence between receive energy and target SNR level, three transmissions can be combined for moderate divergence between receive energy and target SNR level, and so on. In addition, low, moderate, high, etc., degrees of divergence can be specified by specific receive energy shortfalls (e.g., 3 dB/m, 6 dB/m, 9 dB/m, and so on), or ranges of receive energy shortfalls (e.g., 1-3 dB/m, etc.), or the like.

Figure 6:
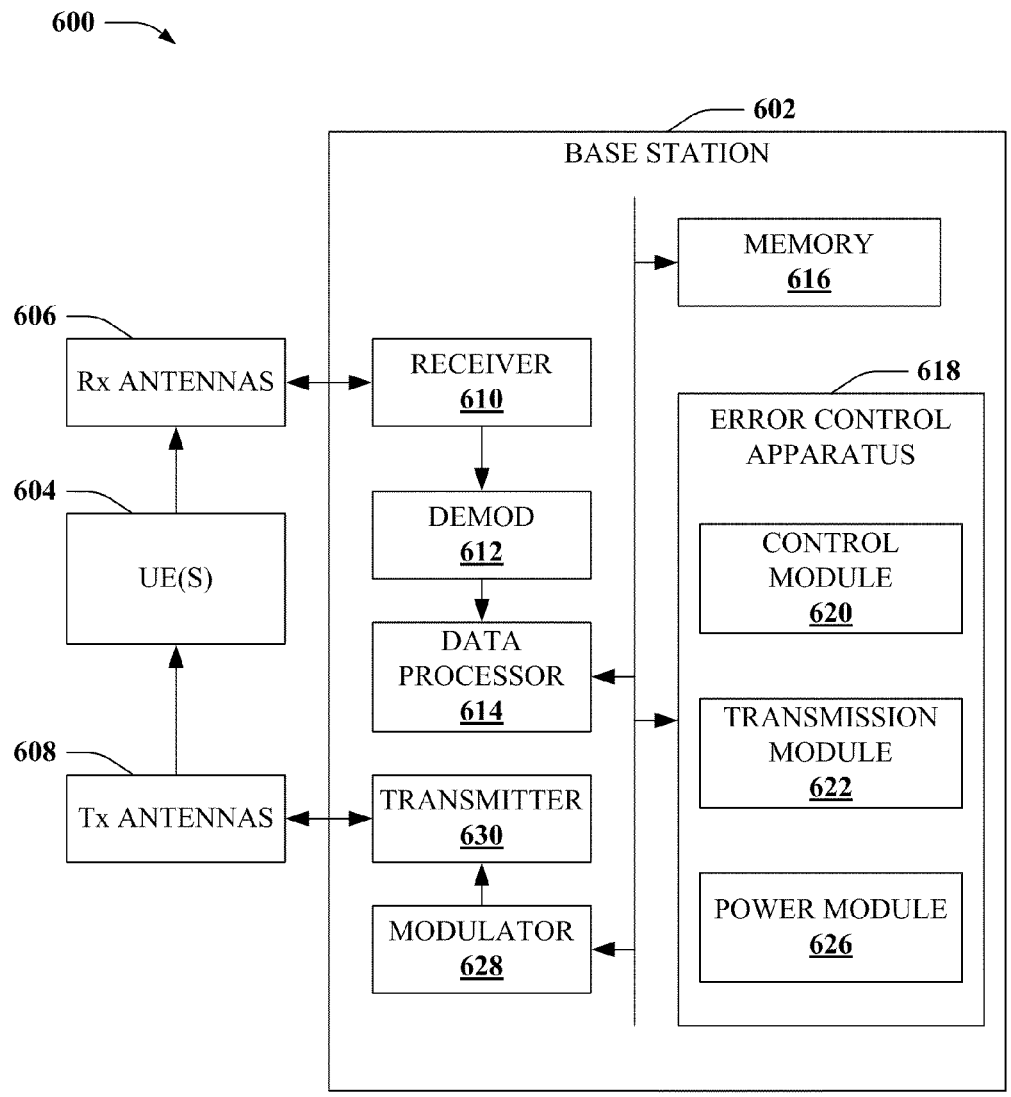
FIG. 6 depicts a block diagram of an example base station according to one or more disclosed aspects.

FIG. 6 illustrates a block diagram of an example system 600 comprising a base station 602 configured for aspects of the subject disclosure. For instance, base station 602 can be configured to provide error control signaling for one or more access terminals (ATs) 604 (e.g., a UE) within a wireless network. In at least one example, base station 602 is configured to employ ARQ or HARQ protocols that are configured to significantly reduce delay for error control signaling as compared with conventional protocols. This reduced delay can be significant in poor wireless conditions where re-transmissions or multiple re-transmissions are often required to obtain a target SNR level, for instance. Accordingly, base station 602 can be configured to provide improved wireless communication, particularly in adverse wireless environments.

Base station 602 (e.g., access point, . . . ) can comprise a receiver 610 that obtains wireless signals from one or more of ATs 604 through one or more receive antennas 606, and a transmitter 630 that sends coded/modulated wireless signals provided by modulator 628 to the AT(s) 604 through a transmit antenna(s) 608. Receiver 610 can obtain information from receive antennas 606 and can further comprise a signal recipient (not shown) that receives uplink data transmitted by AT(s) 604. Additionally, receiver 610 is operatively associated with a demodulator 612 that demodulates received information. Demodulated symbols are analyzed by a data processor 614. Data processor 614 is coupled to a memory 616 that stores information related to functions provided or implemented by base station 602. In one instance, stored information can comprise error control protocols for sending signals and receiving acknowledgments for those signals. In other aspects, stored information can comprise protocols for obtaining user-specific information and dynamically scheduling re-transmissions based on the error control protocols to accommodate a particular AT of AT(s) 604.

To accomplish the above error control signaling, base station 602 can comprise an error control apparatus 618. Error control apparatus 618 can be substantially similar to error control apparatus 104, or to error control apparatus 200, although the subject disclosure is not limited to these implementations. In operation, error control apparatus 618 can employ wireless communication components of base station 602 to communicate with AT(s) 604. To this end, a control module 620 can be employed that establishes re-transmission timing for control or data signals of a HARQ process. The re-transmission timing, as well as a number of re-transmissions of the control or data signals can be determined based on processing capabilities of one or more of AT(s) 604, based on measured SNR level compared with target SNR level of the one or more AT(s) 604 determined by a power module 626, or a total number of TTIs that are available within a minimum separation time of the HARQ process, or the like, or a suitable combination thereof. In at least one particular example, re-transmission timing can be based on a combination of a number of re-transmitted signals required to achieve a target SNR level at an AT(s) 604, up to a maximum re-transmissions equal to a number of total TTIs in a response window of the HARQ process, minus one. Thus, if the total number of TTIs in the response window is four (including a TTI employed for an initial transmission), the maximum re-transmission number can be three. In addition to the foregoing, the number of re-transmitted signals can optionally be limited based on processing capability of the AT(s) 604. Thus, where processing speed of the AT(s) 604 does not enable processing of signals in all TTIs prior to a response time, one or more TTIs can be blanked with no transmissions for the AT(s) 604. Once re-transmission timing and re-transmission scheduling are established, a transmission module 626 can be executed that employs the re-transmission timing to transmit and re-transmit control or data signals on the HARQ process in less than the minimum separation time thereof, as described herein.

FIG. 7 illustrates a block diagram of an example wireless communication system 700 comprising an AT 702 according to one or more additional aspects of the subject disclosure. AT 702 can be configured to wirelessly communicate with one or more base stations 704 (e.g., access point(s)) of a wireless network. Based on such configuration, AT 702 can receive wireless signals from base station(s) 704 on one or more forward link channels and respond with wireless signals on one or more reverse link channels. In addition, AT 702 can comprise instructions stored in memory 714 for employing a low delay error correction protocol 714A for performing acknowledgment signaling in response to signals transmitted by base stations(s) 704, or for obtaining acknowledgment signaling from base station(s) 704 pertaining to uplink data transmissions sent by AT 702.

AT 702 includes at least one antenna 706 (e.g., comprising one or more input/output interfaces) that receives a signal and receiver(s) 708, which perform typical actions (e.g., filters, amplifies, down-converts, etc.) on the received signal. In general, antenna 706 and a transmitter 722 (collectively referred to as a transceiver) can be configured to facilitate wireless data exchange with base station(s) 704. Further, various modules or applications executed at AT 702 can employ the transceiver to acquire data transmitted by base station(s) 704 or send data to base station(s) 704.

Antenna 706 and receiver(s) 708 can also be coupled with a demodulator 710 that can demodulate received symbols and provide demodulated symbols to a data processor(s) 712 for evaluation. It should be appreciated that data processor(s) 712 can control and/or reference one or more components (antenna 706, receiver 708, demodulator 710, memory 714, feedback timing apparatus 716, buffering module 718, analysis module 720, feedback module 722, validity module 724, iteration module 726, power estimation module 728, timing module 730, synchronization module 732, modulator 734, transmitter 736) of AT 702. Further, data processor(s) 712 can execute one or more modules, applications, engines, or the like that comprise information or controls pertinent to executing functions of AT 702.

Additionally, memory 714 of AT 702 is operatively coupled to data processor(s) 712. Memory 714 can store data to be transmitted, received, and the like, and instructions suitable to conduct wireless communication with a remote device (e.g., one or more of BS(s) 704). In addition, memory 714 can comprise a low delay error correction protocol 714A (e.g., based on a modified HARQ protocol) employed to employed to provide acknowledgment signaling in response to downlink signals transmitted by base station(s) 704, identify transmissions on a common HARQ process, selectively combine one or more re-transmissions of an initial signal with the initial signal to achieve a target SNR level, provide information pertinent to re-transmission scheduling, such as a measured SNR level of downlink transmissions of base station(s) 704, processing capabilities of data processor 712 (which can include static processing capabilities, or dynamic processing capabilities affected by prevailing memory, currently running applications, and so on) or other functions described herein. Additionally, memory 714 can comprise an RV mapping 714B to identify a correlation between a RV for different re-transmitted signals based on an incremental redundancy policy.

In operation, feedback timing apparatus 716 can comprise a buffering module 718 that obtains multiple data signals of a HARQ process within a single feedback response window on that HARQ process. In at least one aspect, the feedback response window is defined to begin with a TTI in which a first of the multiple data signals is transmitted, and terminate with a subsequent TTI in which ACK/NACK signaling is scheduled. An analysis module 720 can be employed to combine a subset of the multiple data signals. Selection of how many of the multiple data signals included in the subset of the multiple data signals can be based on a measured SNR level of at least one of the signals (e.g., an initial signal) compared with a target SNR level. A suitable number of the multiple data signals can be selected to achieve the target SNR level for the initial signal. In at least some aspects of the subject disclosure, fewer than all of the multiple data signals can be combined by analysis module 720 according to one or more circumstances, such as processing constraints of AT 702, minimizing control overhead, battery power constraints of AT 702, or the like, or a suitable combination thereof.

Further to the above, feedback timing apparatus 716 can comprise a feedback module 722 that performs ACKNACK signaling in response to the multiple data signals. The ACK/NACK signaling is transmitted at a scheduled feedback time according to HARQ protocol 714A. Generally, the scheduled feedback time is a set number of TTIs after transmission of a first of the multiple data signals on the HARQ process. However, the scheduled feedback time can be adjusted dynamically by base station(s) 704 through control signaling in at least some aspects of the subject disclosure.

In order to properly receive the multiple data signals transmitted by base station(s) 704, analysis module 720 decodes a control channel instruction for the HARQ process that contains information on locating and decoding the multiple data signals, or re-transmissions thereof Feedback timing apparatus 716 can further comprise a validity module 724 that identifies a duration for which the control channel instruction is valid. In one example, validity module 724 explicitly determines the duration from the control channel instruction or a related control channel instruction. In another example, the duration can be determined from radio resource control signaling, or from system information signaling. In at least one aspect, the duration can be determined from a suitable combination of the foregoing.

Once the duration of the control channel instructions is determined, an iteration module 726 can be executed that identifies a transmission specific variable for downlink transmissions within the duration from a deterministic mapping function (e.g., RV mapping 714B). This deterministic mapping function can identify respective transmissions and re-transmissions of an initial signal based on an identifier included within the respective transmission(s), wherein the identifier is determined from a cell identifier associated with one or more of base station(s) 704, a user equipment identifier or a subframe of the control channel instruction, or a suitable combination thereof. In at least one aspect, the transmission specific variable comprises a RV associated with the downlink transmission.

According to one particular aspect of the subject disclosure, feedback timing apparatus 716 can comprise a power estimation module 728 that instructs the analysis module 720 to combine a number of the multiple data signals that is sufficient to meet the target SNR level. Alternatively, or in addition, feedback timing apparatus 716 can comprise a timing module that limits the number of the multiple data signals combined by the analysis module 720 for decoding based at least in part on processing speed of AT 702. Optionally, the number of the multiple data signals can be limited on the processing speed in comparison with size of the feedback response window, or location of respective signals within the feedback response window. For instance, where the processing speed of AT 702 requires at least one TTI prior to feedback module 722 performing ACK/NACK signaling, timing module 730 can limit a number the number of multiple data signals combined by analysis module 720 to exclude the TTI immediately prior to a scheduled ACK/NACK signaling. According to one further aspect of the subject disclosure, feedback timing apparatus 716 can additionally comprise a synchronization module 732 that provides base station(s) 704 with an energy measurement for signals received from base station(s) 704 by power estimation module 728, and a processing speed for AT 702 determined by timing module 730, to facilitate transmission of a suitable number of the multiple data signals, or a suitable time-based scheduling of respective data signals, or both.

The aforementioned systems have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include UE 502 comprising feedback timing apparatus 716, BS 504 comprising error control apparatus 200, or a different combination of these or other entities. Sub-modules could also be implemented as modules communicatively coupled to other modules rather than included within parent modules. Additionally, it should be noted that one or more modules could be combined into a single module providing aggregate functionality. For instance, analysis module 720 can include power estimation module 728, or vice versa, to facilitate comparing a received signal to a target SNR level and combining a suitable number of re-transmissions of the received signal to achieve the target SNR level, by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 8:
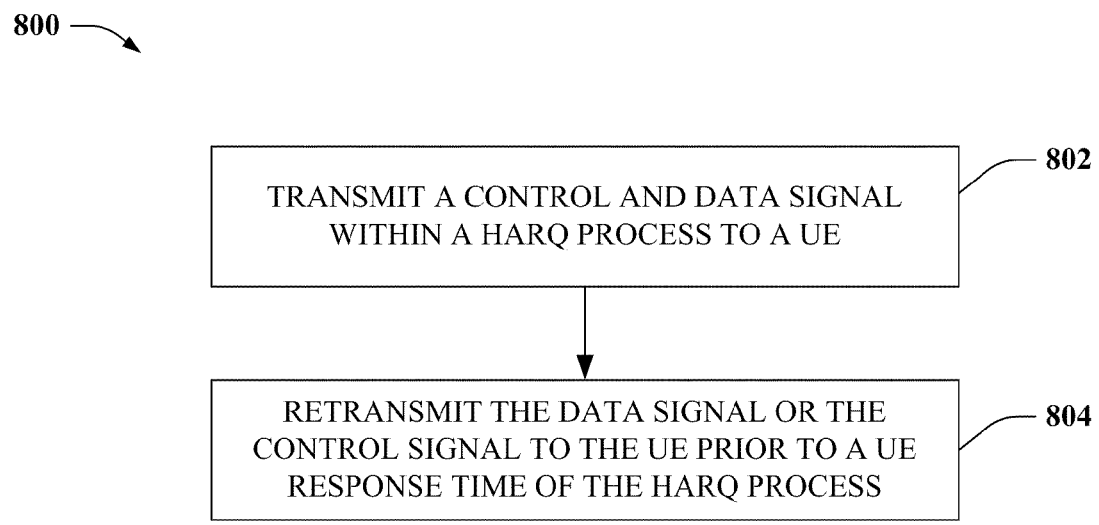
FIG. 8 illustrates a flowchart of a sample methodology for facilitating improved feedback signaling in wireless communication according to disclosed aspects.

FIG. 8 illustrates a flowchart of an example methodology 800 according to aspects of the subject disclosure. Particularly, method 800, at 802, can comprise transmitting a control and a data signal in a HARQ process to a UE. Furthermore, at 804, method 800 can comprise re-transmitting the data signal or the control signal to the UE prior to UE response time of the HARQ process. According to one aspect of the subject disclosure, transmitting and re-transmitting the data signal or the control signal are performed in subsequent subframes of a wireless channel. Whereas in other aspects, transmitting and re-transmitting the data signal or the control signal are performed in non-subsequent subframes that are prior to the UE response time. In one particular example, method 800 can comprise selecting between transmitting and re-transmitting in subsequent or non-subsequent subframes of a wireless channel based at least in part on estimated receive power at the UE and processing capabilities of the UE. In this example, selecting transmitting and re-transmitting in subsequent subframes if processing capabilities of the UE do not permit the UE to receive and process two non-subsequent signals prior to the UE response time. Accordingly, method 800 can enable reduced delay in error control signaling, such as HARQ signaling, by enabling transmission and re-transmission of a signal prior to scheduled acknowledgment signals by the UE.

Figure 9:
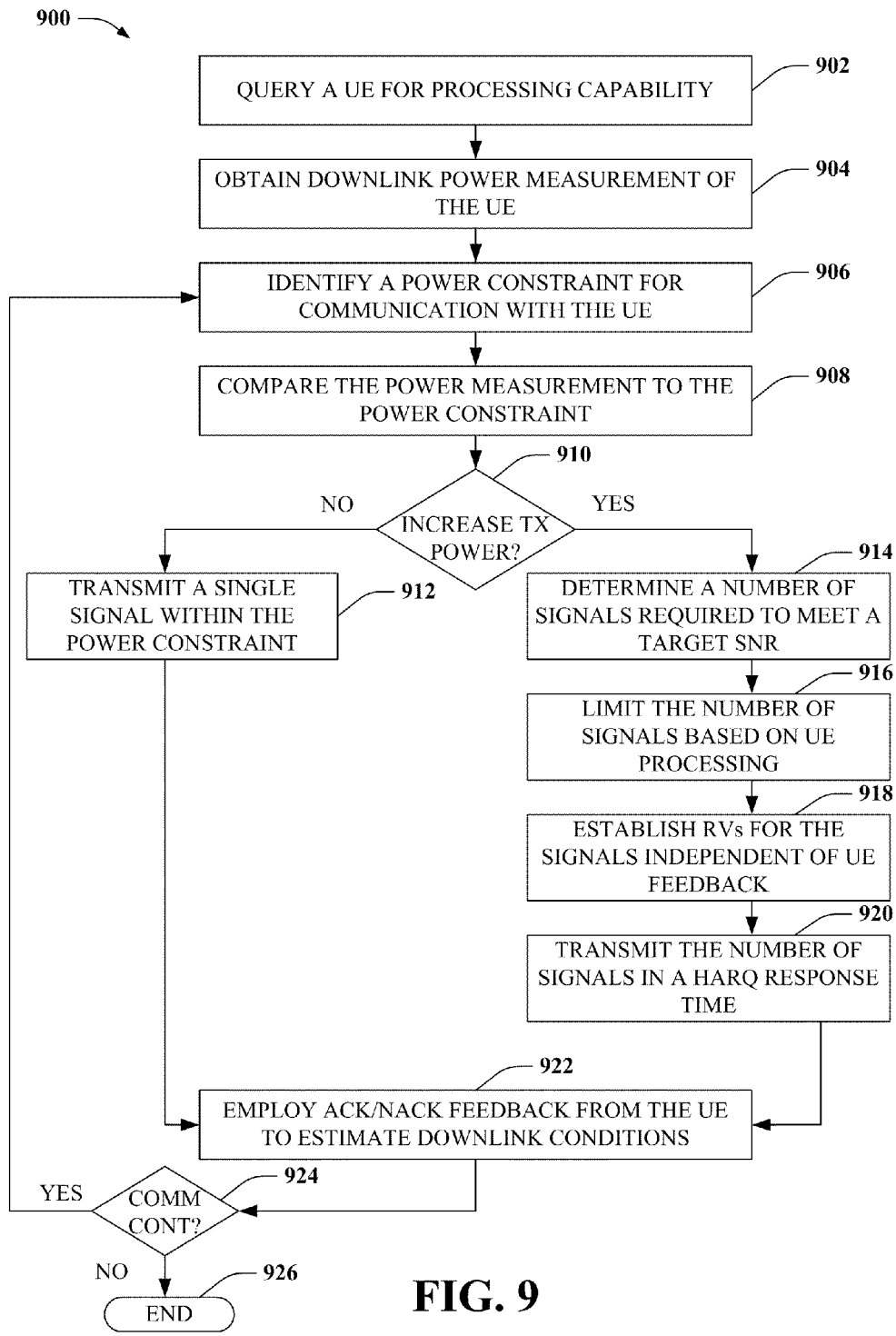
FIG. 9 illustrates a flowchart of an example methodology for reducing delay in HARQ communications according to particular aspects.

FIG. 9 depicts a flowchart of a sample methodology 900 according to additional aspects of the subject disclosure. At 902, method 900 can comprise querying a UE for signal processing capabilities of the UE (e.g., a processing speed of the UE) and receiving a report of the signal processing capabilities in response. At 904, method 900 can comprise obtaining a downlink power measurement of the UE for downlink signals transmitted by a base station. At 906, method 900 can comprise identifying a power constraint that governs transmissions to the UE. At 908, method 900 can comprise comparing the power measurement to the power constraint and, at 910, determining whether transmit power at or below the power constraint will meet a target power measurement at the UE. If power measurement does not need to be increased, method 900 can proceed to 912; otherwise method 900 proceeds to 914.

At 912, method 900 can comprise transmitting a single signal within the power constraint to the UE to accomplish a wireless communication with the UE. From 912, method 900 proceeds to 922. At 914, method 900 can comprise determining a number of signals required to meet a target SNR at the UE. At 916, method 900 can comprise limiting the number of signals transmitted to the UE based on the UE processing capability. At 918, method 900 can comprise establishing a same or a different RV of the control signal or the data signal independent of ACK or NACK feedback from the UE. At 920, method 900 can comprise re-transmitting the data signal or the control signal to the UE at or below the power constraint a determined number of times based on the target SNR and the UE processing capabilities to increase effective receive energy observed at the UE. In one instance, re-transmitting the data signal or the control signal can comprise transmitting a combination of different RVs of the control signal or the data signal independent of ACK/NACK feedback from the UE. At 922, method 900 can comprise obtaining ACK/NACK feedback from the UE based on transmission and re-transmission of the control signal or the data signal and deriving downlink channel conditions observed by the UE at least in part on ACK/NACK signals pertaining to the control signal and the data signal transmitted by the UE. In at least one aspect, method 900 can additionally comprise employing the downlink channel conditions for resource scheduling pertaining to re-transmitting the data signal or the control signal.

At 924, method 900 can comprise determining whether additional communications on the HARQ process exist. If not, method 900 can proceed to 926 and end. Otherwise, method 900 can return to reference number 906. As described method 900 can provide flexible error control signaling that reduces signal delay in wireless communications, and that is tailored to particular wireless conditions and processing capabilities of a UE.

Figure 10:
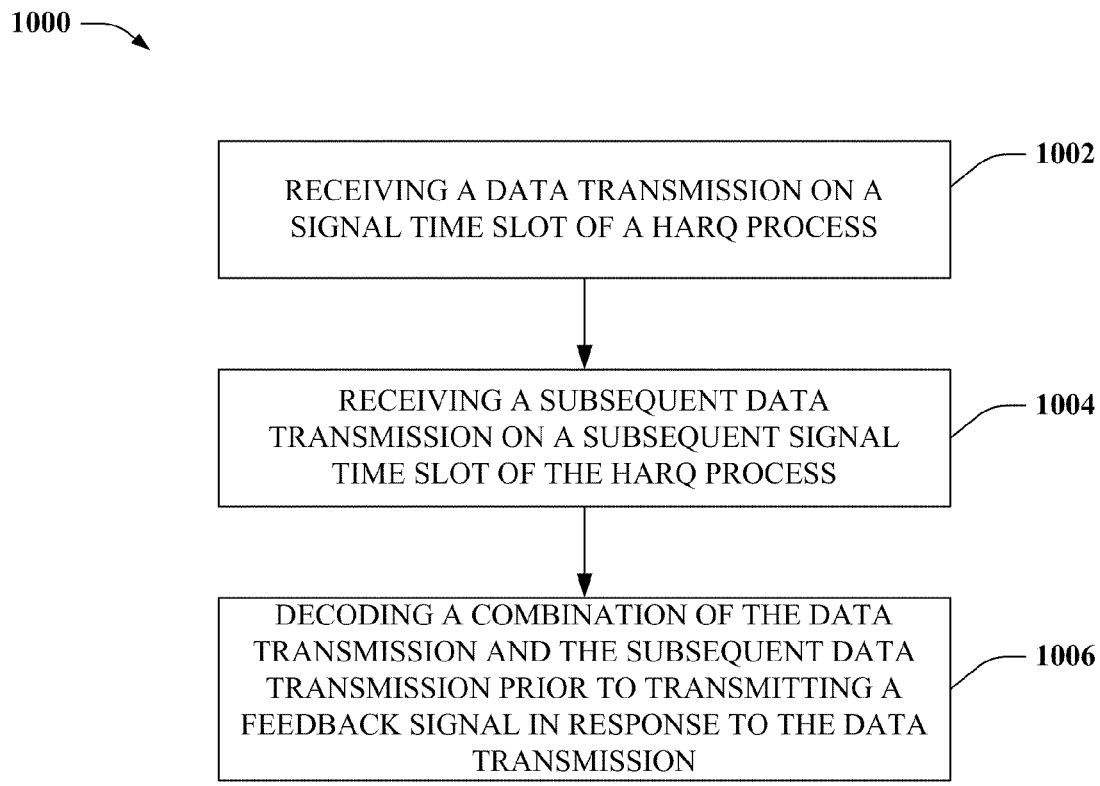
FIG. 10 depicts a flowchart of a sample methodology for providing error correction in wireless communication according to aspects of the subject disclosure.

FIG. 10 illustrates a flowchart of an example methodology 1000 according to still other aspects of the subject disclosure. At 1002, method 1000 can comprise receiving a data transmission on a signal time slot of a HARQ process. At 1004, method 1000 can comprise receiving a subsequent data transmission on a subsequent signal time slot of the HARQ process. Additionally, at 1006, method 1000 can comprise decoding a combination of the data transmission and the subsequent data transmission prior to transmitting a feedback signal in response to the data transmission. By combining the data transmission and subsequent transmission prior to the transmitting the feedback signal, receive power of the data transmission can be increased in a lesser time than would otherwise be required in conventional error control signaling.

Figure 11:
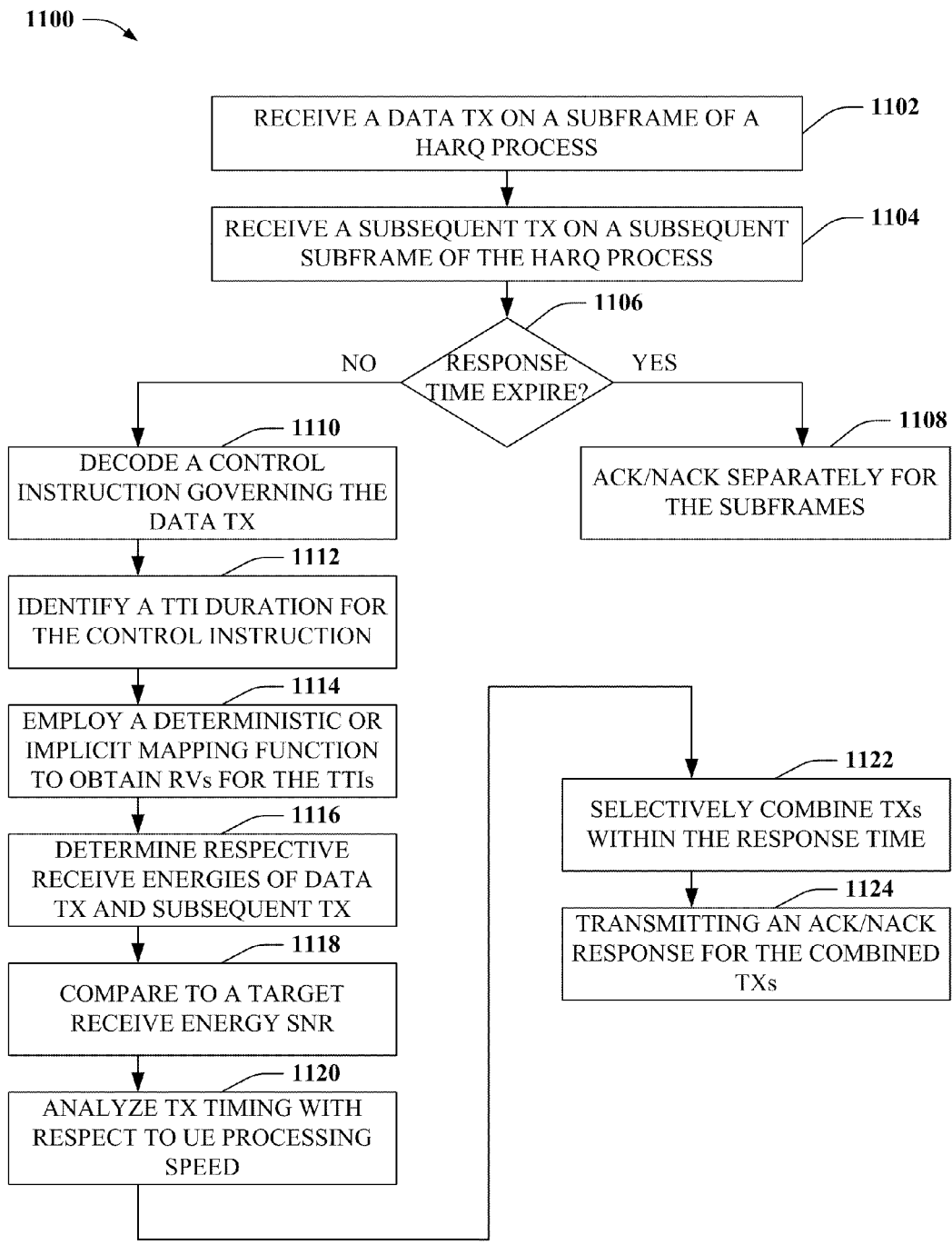
FIG. 11 illustrates a flowchart of an example methodology providing reduced delay for HARQ signaling according to particular aspects.

FIG. 11 depicts a flowchart of a sample methodology 1100 according to additional aspects of the subject disclosure. At 1102, method 1100 can comprise receiving a data transmission on a subframe of a HARQ process, and, at 1104, receiving a subsequent transmission on a subsequent subframe of the HARQ process. At 1106, a determination is made as to whether a response time to the data transmission has expired. If not, method 1100 can proceed to 1108; otherwise method 1100 comprises inferring that the subsequent data transmission is a re-transmission of the HARQ process if received prior to scheduled feedback signaling for the data transmission, and proceeds to 1110.

At 1108, method 1100 can comprise sending a result of decoding the data transmission and the subsequent data transmission in separate uplink ACK or NACK responses for the HARQ process. Method 1100 can end after reference number 1108. At 1110, method 1100 can comprise decoding a control instruction governing the data transmission. At 1112, method 1100 can comprise obtaining a control channel signal that governs decoding of data transmissions for the HARQ process, and receiving a network instruction that specifies or implies a TTI duration for the a control channel signal. At 1114, method 1100 can comprise deriving a RV for respective TTIs of the TTI duration from a network mapping function. In one aspect, deriving the RV can comprise employing a deterministic or implicit mapping function to obtain RVs for the respective TTIs. At 1116, method 1100 can comprise determining a RV for respective TTIs of the TTI duration based on a cell identifier, a UE identifier or a subframe number in which the control channel signal or the data transmission is received, or a combination thereof.

At 1118, method 1100 can comprise comparing a receive energy of the data transmission to a target receive energy. At 1120, method 1100 can comprise receiving a request for processing capability of a UE receiving the data transmission, and responding with a metric of the processing capability, wherein a number of subsequent data transmissions or a TTI delay of the subsequent data transmission is based at least in part on the metric of the processing capability. Additionally at 1120, method 1100 can comprise analyzing transmission timing with respect to the UE processing speed. At 1122, method 1100 can comprise selectively combining the data transmission with the subsequent data transmission or with additional subsequent data transmissions received prior to transmitting the feedback signal. In at least one example, selectively combining the data transmission with the subsequent data transmission or with additional subsequent data transmissions is based at least in part on a receive energy of the data transmission and the processing capability of the UE receiving the data transmission. At 1124, method 1100 can comprise transmitting a result of the data transmission and the subsequent data transmission (or additional subsequent data transmissions) in an uplink ACK or NACK response for the HARQ process.

Figure 12:
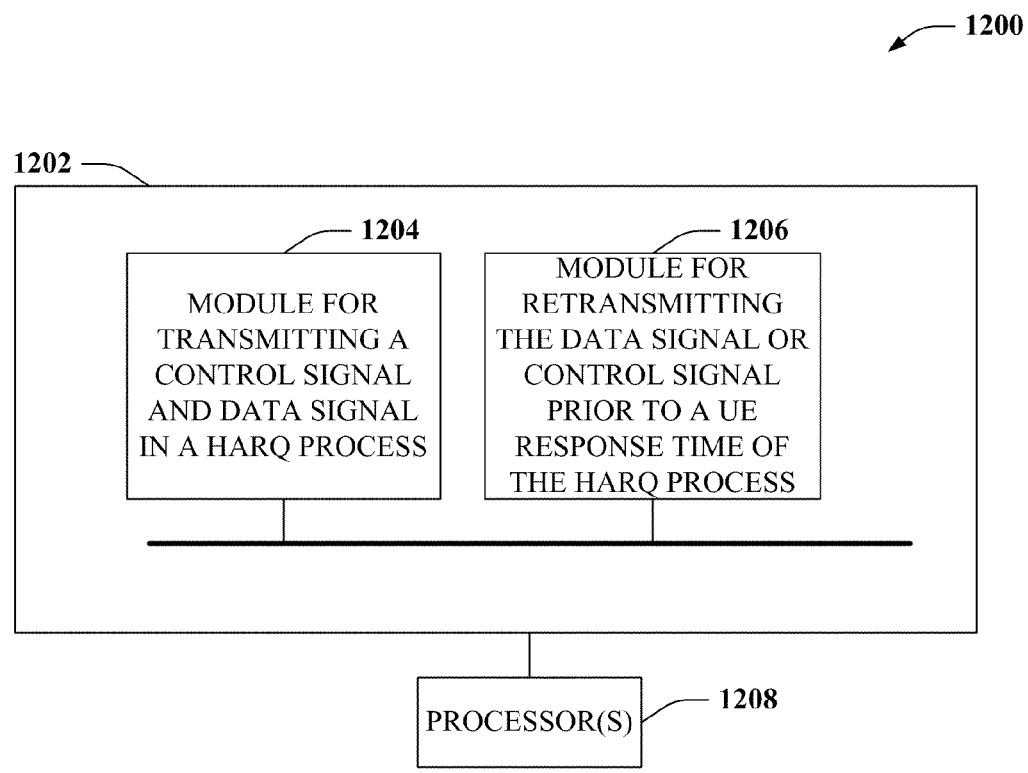
FIG. 12 depicts a block diagram of a sample electronic apparatus configured for error correction in wireless communication.
Figure 13:
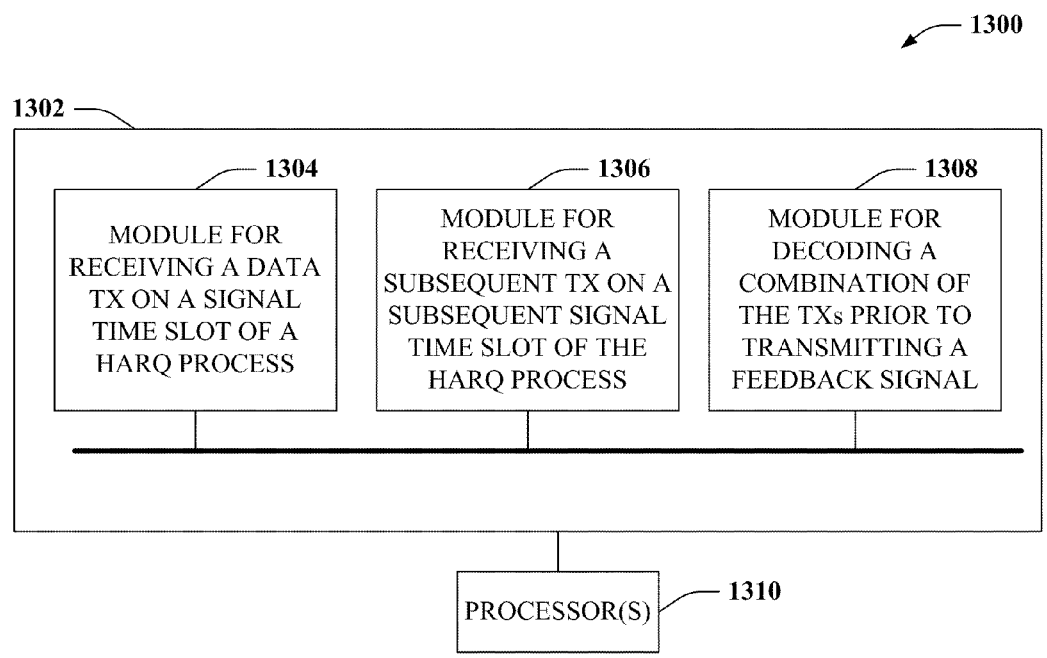
FIG. 13 illustrates a block diagram of an example electronic apparatus for reduced feedback delay in wireless communications.

FIGS. 12 and 13 illustrate various example apparatuses 1200 and 1300 (e.g., electronic devices) for providing network-assisted cell acquisition in a heterogeneous access point wireless network according to aspects of the subject disclosure. For example, apparatuses 1200 and 1300 can reside at least partially within a wireless communication network and/or within a transmitter such as a node, base station, access point, user terminal, personal computer coupled with a mobile interface card, or the like. It is to be appreciated that apparatuses 1200 and 1300 are represented as including functional blocks, which can be functional blocks that represent functions implemented by a processor, software, or combination thereof (e.g., firmware).

FIG. 12 depicts a block diagram of a sample apparatus 1200 according to additional aspects of the subject disclosure. Apparatus 1200 can comprise memory 1202 for storing modules or instructions for implementing reduced delay for error control signaling in wireless communications, and a data processor 1208 for executing the modules or instructions. Further, apparatus 1200 can comprise a module 1204 for transmitting a control signal and a data signal in a HARQ process to a UE. In addition, apparatus 1200 can also comprise a module 1206 for re-transmitting the data signal or the control signal to the UE prior to a UE response time of the HARQ process. In at least one aspect, the UE response time comprises a scheduled ACK/NACK signaling subframe correlated with a subframe in which the control signal or the data signal are initially transmitted.

FIG. 13 illustrates a block diagram of an example apparatus 1300 according to still other aspects of the subject disclosure. Apparatus 1300 can comprise memory 1302 for storing modules or instructions for implementing feedback signaling in wireless communications according to error control signals configured to provide reduced delay or reduced overhead for the wireless communication, and a data processor 1310 for executing the modules or instructions. Specifically, apparatus 1300 can comprise a module 1304 for receiving a data transmission on a signal time slot of a HARQ process. Further, apparatus 1300 can comprise a module 1306 for receiving a subsequent data transmission on a subsequent signal time slot of the HARQ process. According to particular aspects of the subject disclosure, apparatus 1300 can additionally comprise a module 1308 for decoding a combination of the data transmission and the subsequent data transmission prior to transmitting a feedback signal in response to the data transmission. Apparatus 1300 can then send the feedback signal pertaining to the combined data transmission and subsequent data transmission, enabling an increase in receive energy for the data transmission without waiting for a minimum separation time employed by conventional HARQ processes for re-transmission of prior signals.

Figure 14:
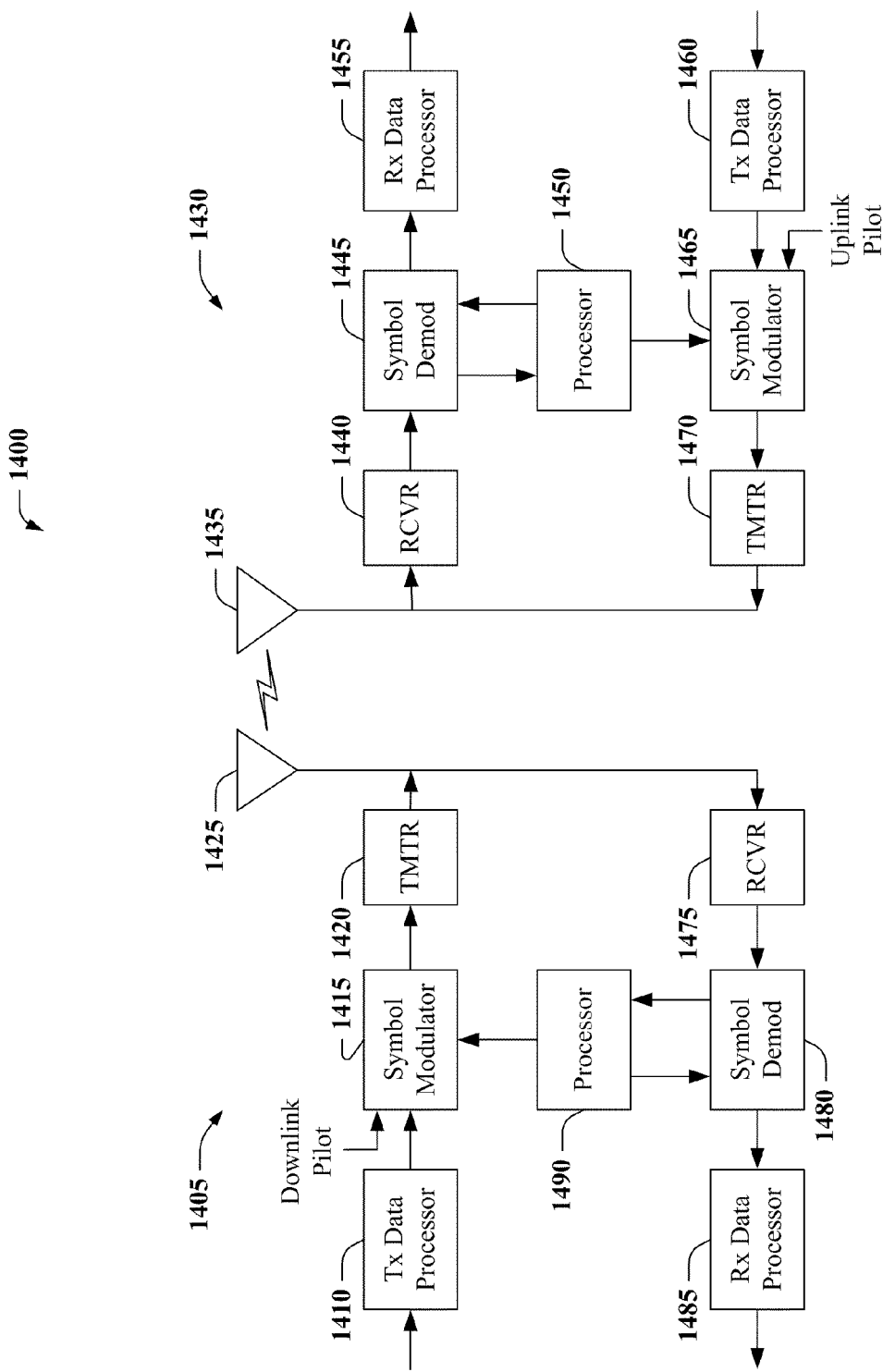
FIG. 14 illustrates a block diagram of an example wireless communication system for facilitating various aspects of the subject disclosure.

FIG. 14 depicts a block diagram of an example system 1400 that can facilitate wireless communication according to some aspects disclosed herein. On a DL, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. A symbol modulator 1415 multiplexes data and pilot symbols and provides them to a transmitter unit (TMTR) 1420. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1420 receives and converts the stream of symbols into one or more analog signals and further conditions (e.g., amplifies, filters, and frequency upconverts) the analog signals to generate a DL signal suitable for transmission over the wireless channel. The DL signal is then transmitted through an antenna 1425 to the terminals. At terminal 1430, an antenna 1435 receives the DL signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 demodulates and provides received pilot symbols to a processor 1450 for channel estimation. Symbol demodulator 1445 further receives a frequency response estimate for the DL from processor 1450, performs data demodulation on the received data symbols to obtain data symbol estimates (which are estimates of the transmitted data symbols), and provides the data symbol estimates to an RX data processor 1455, which demodulates (i.e., symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the UL, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an UL signal, which is transmitted by the antenna 1435 to the access point 1405. Specifically, the UL signal can be in accordance with SC-FDMA requirements and can include frequency hopping mechanisms as described herein.

At access point 1405, the UL signal from terminal 1430 is received by the antenna 1425 and processed by a receiver unit 1475 to obtain samples. A symbol demodulator 1480 then processes the samples and provides received pilot symbols and data symbol estimates for the UL. An RX data processor 1485 processes the data symbol estimates to recover the traffic data transmitted by terminal 1430. A processor 1490 performs channel estimation for each active terminal transmitting on the UL. Multiple terminals can transmit pilot concurrently on the UL on their respective assigned sets of pilot sub-bands, where the pilot sub-band sets can be interlaced.

Processors 1490 and 1450 direct (e.g., control, coordinate, manage, etc.) operation at access point 1405 and terminal 1430, respectively. Respective processors 1490 and 1450 can be associated with memory units (not shown) that store program codes and data. Processors 1490 and 1450 can also perform computations to derive frequency and time-based impulse response estimates for the UL and DL, respectively.

For a multiple-access system (e.g., SC-FDMA, FDMA, OFDMA, CDMA, TDMA, etc.), multiple terminals can transmit concurrently on the UL. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal.

The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1490 and 1450.

Figure 15:
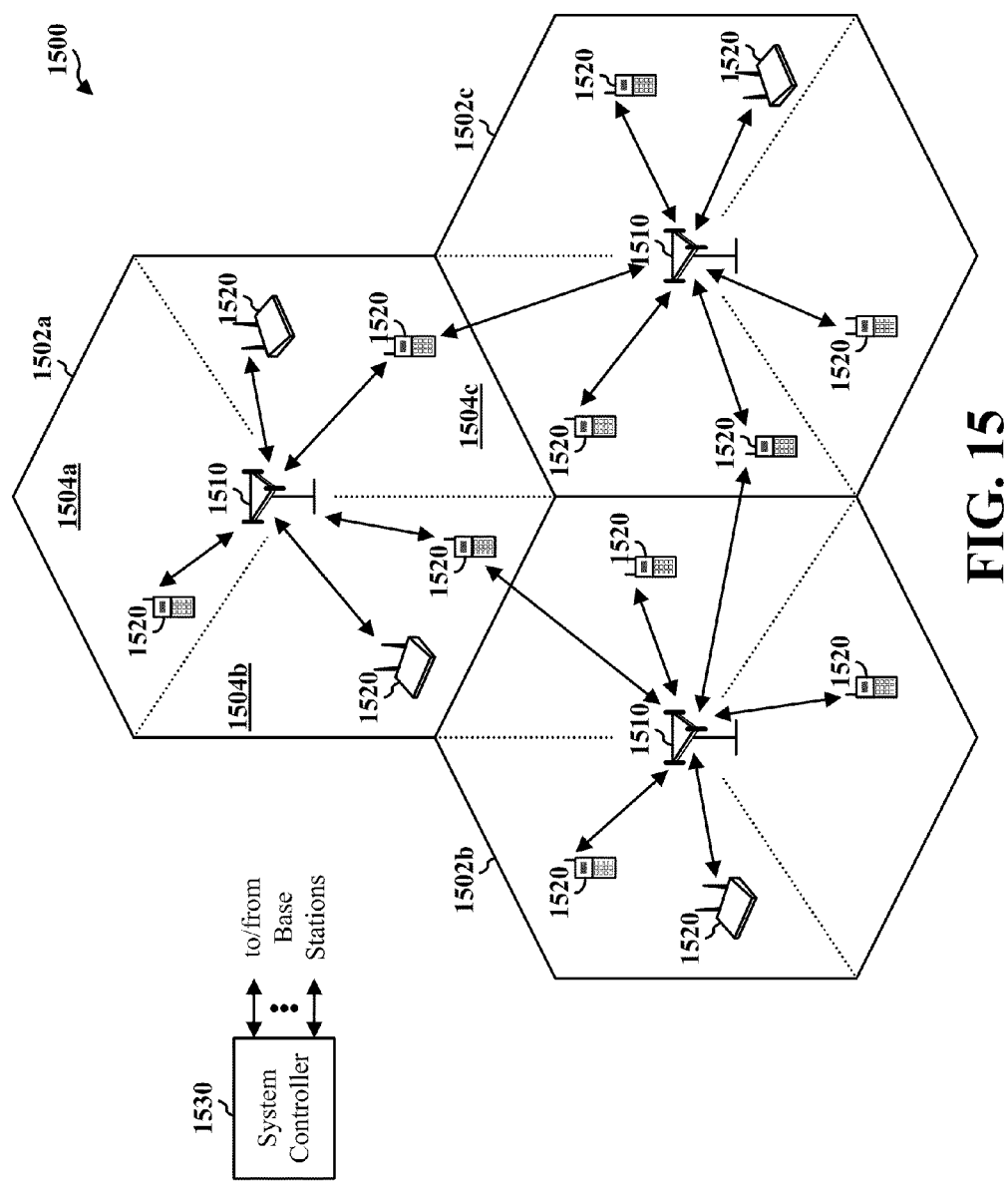
FIG. 15 depicts a block diagram of an example wireless transmit-receive chain facilitating wireless communication according to some disclosed aspects.

FIG. 15 illustrates a wireless communication system 1500 with multiple base stations 1510 (e.g., wireless access points, wireless communication apparatus) and multiple terminals 1520 (e.g., ATs), such as can be utilized in conjunction with one or more aspects. A base station 1510 is generally a fixed station that communicates with the terminals and can interchangeably be called an access point, a Node B, or some other terminology, except where a particular term is implied by surrounding context. Each base station 1510 provides communication coverage for a particular geographic area or coverage area, illustrated as three geographic areas in FIG. 15, labeled 1502a, 1502b, and 1502c. The term "cell" can refer to a BS or its coverage area depending on the context in which the term is used. To improve system capacity, a BS geographic area/coverage area can be partitioned into multiple smaller areas (e.g., three smaller areas, according to cell 1502a in FIGS. 15), 1504a, 1504b, and 1504c. Each smaller area (1504a, 1504b, 1504c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1520 are typically dispersed throughout the system, and each terminal 1520 can be fixed or mobile. Terminals 1520 can also be called a mobile station, user equipment, a user device, wireless communication apparatus, an access terminal, a user terminal or some other terminology. A terminal 1520 can be a wireless device, a cellular phone, a personal digital assistant (PDA), a wireless modem card, and so on. Each terminal 1520 can communicate with zero, one, or multiple base stations 1510 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1530 couples to base stations 1510 and provides coordination and control for base stations 1510. For a distributed architecture, base stations 1510 can communicate with one another as needed (e.g., by way of a wired or wireless backhaul network communicatively coupling the base stations 1510). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 16:
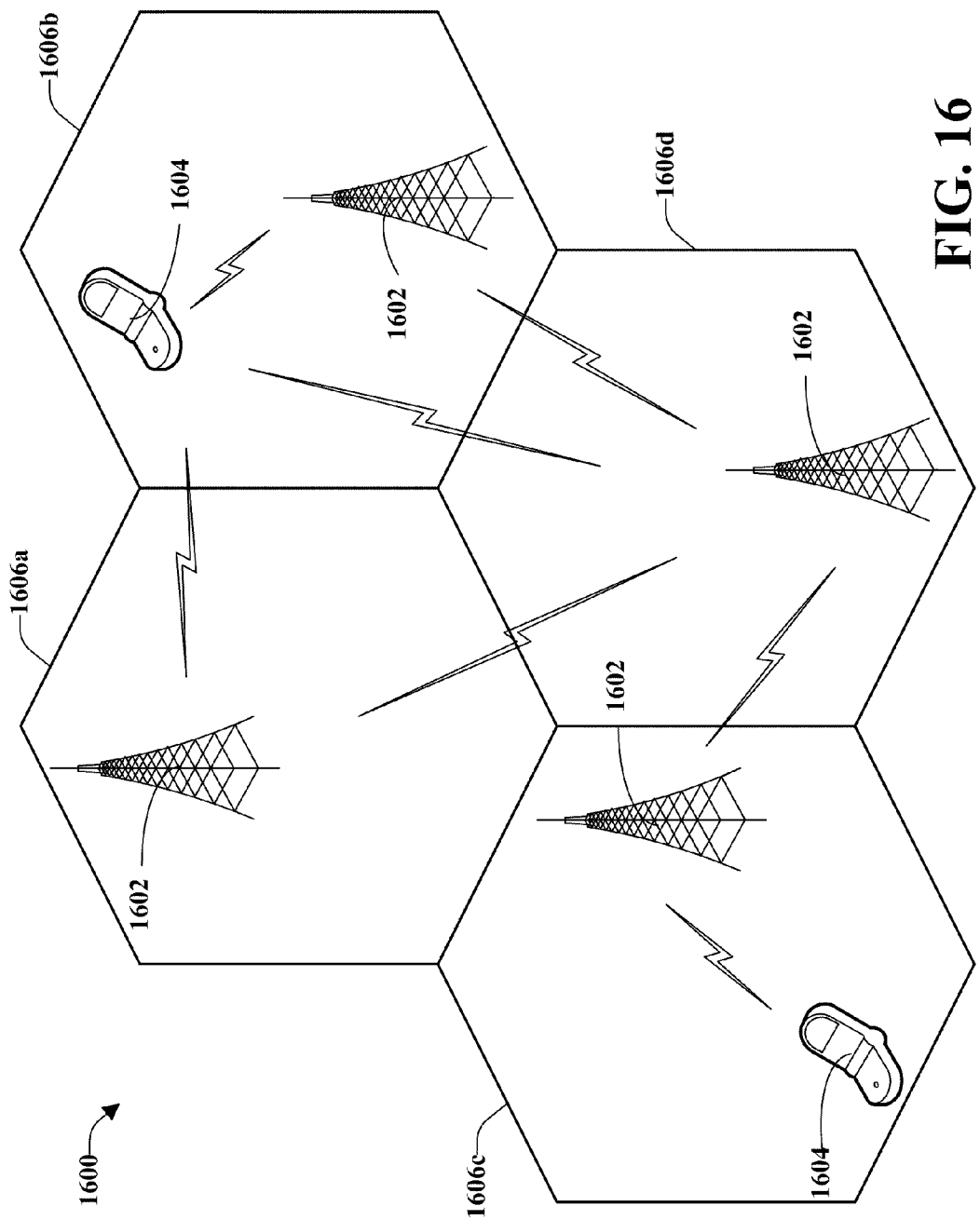
FIG. 16 illustrates a block diagram of an example communication system to enable deployment of access point base stations within a network environment.

FIG. 16 is an illustration of a planned or semi-planned wireless communication environment 1600, in accordance with various aspects. Wireless communication environment 1600 can comprise one or more base stations 1602 in one or more cells and/or sectors that receive, transmit, repeat, etc., wireless communication signals to each other and/or to one or more mobile devices 1604. As illustrated, each base station 1602 can provide communication coverage for a particular geographic area, illustrated as four geographic areas, labeled 1606a, 1606b, 1606c and 1606d. Each base station 1602 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 14, supra), as will be appreciated by one skilled in the art. Mobile devices 1604 can be, for example, cellular phones, smart phones, laptops, handheld communication devices, handheld computing devices, satellite radios, global positioning systems, PDAs, or any other suitable device for communicating over wireless communication environment 1600. Wireless communication environment 1600 can be employed in conjunction with various aspects described herein in order to facilitate multi-node relay assignment and cell-splitting effects in wireless communication, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, AT, user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive ... ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for wireless communication comprising:
    transmitting a control signal and a data signal in a hybrid automatic repeat request (HARQ) process to a user equipment (UE) in a subframe of a wireless channel; and
    re-transmitting the data signal or the control signal to the UE prior to a UE response time of the HARQ process
    wherein, transmitting the control signal and the data signal and re-transmitting the data signal or the control signal are performed in subsequent or non-subsequent subframes of the wireless channel based at least in part on estimated receive power at the UE and processing capabilities of the UE.

2. The method of claim 1, wherein transmitting and re-transmitting the data signal or the control signal are performed in subsequent subframes of a wireless channel.

3. The method of claim 1, further comprising selecting re-transmitting in subsequent subframes if processing capabilities of the UE do not permit the UE to receive and process two non-subsequent signals prior to the UE response time.

4. The method of claim 1, further comprising transmitting a same or a different redundancy version (RV) of the control signal or the data signal independent of acknowledgment (ACK) or negative acknowledgment (NACK) feedback from the UE.

5. The method of claim 1, further comprising transmitting a combination of different RVs of the control signal or the data signal independent of ACK/NACK feedback from the UE.

6. The method of claim 1, further comprising deriving downlink channel conditions observed by the UE at least in part on ACK/NACK signals pertaining to the control signal and the data signal transmitted by the UE.

7. An apparatus for wireless communication, comprising:
 a communication interface for employing a wireless transceiver to exchange wireless signals with a user equipment (UE);
 a memory for storing instructions to provide reduced delay for hybrid automatic repeat request (HARQ) signals in a wireless communication; and
 a data processor for executing modules that implement the instructions, the modules comprising:
  a control module that establishes re-transmission timing for control or data signals of a HARQ process; and
  a transmission module that employs the re-transmission timing to transmit and then re-transmit a control signal or a data signal for the HARQ process in less than a minimum separation time of the HARQ process, wherein the transmission module further transmits to the UE a duration of transmission time intervals (TTIs) over which the control signal is valid.

8. The apparatus of claim 7, wherein the minimum separation time defines a response period between initiating a downlink transmission on the HARQ process and initiation of an uplink acknowledgment (ACK) or negative acknowledgment (NACK) transmission by the UE.

9. The apparatus of claim 7, wherein transmission and re-transmission of the control signal or the data signal are in consecutive subframes or non-consecutive subframes within the minimum separation time.

10. The apparatus of claim 7, wherein the control module establishes a system information block transmission, a radio resource control transmission or a physical downlink control channel transmission for transmitting the duration of TTIs.

11. The apparatus of claim 7, wherein the control module employs a mapping function to specify a redundancy version (RV) for respective TTIs within the duration of TTIs.

12. The apparatus of claim 7, wherein the control module establishes a deterministic relationship between a RV and an identifier of the UE, a cell identifier or a subframe number, for respective TTIs within the duration of TTIs.

13. The apparatus of claim 7, wherein the transmission module sends a payload of a second control signal within the duration of TTIs, and further wherein the payload is applicable to the HARQ process, or to another HARQ process of the wireless communication.

14. The apparatus of claim 7, further comprising a power module that identifies a transmit power constraint for the wireless communication and a target receive energy of the UE.

15. An apparatus for wireless communication, comprising:
 means for transmitting a control signal and a data signal in a hybrid automatic repeat request (HARQ) process to a user equipment (UE) in a subframe of a wireless channel; and
 means for re-transmitting the data signal or the control signal to the UE prior to a UE response time of the HARQ process
 wherein, transmitting the control signal and the data signal and re-transmitting the data signal or the control signal are performed in subsequent or non-subsequent subframes of the wireless channel based at least in part on estimated receive power at the UE and processing capabilities of the UE.

16. At least one processor configured for wireless communication, comprising:
 a first module that transmits a control signal and a data signal in a hybrid automatic repeat request (HARQ) process to a user equipment (UE) in a subframe of a wireless channel; and
 a second module that re-transmits the data signal or the control signal to the UE prior to a UE response time of the HARQ process
 wherein, transmitting the control signal and the data signal and re-transmitting the data signal or the control signal are performed in subsequent or non-subsequent subframes of the wireless channel based at least in part on estimated receive power at the UE and processing capabilities of the UE.

17. A computer program product, comprising:
 a non-transitory computer-readable medium, comprising:
  a first set of codes for causing a computer to transmit a control signal and a data signal in a hybrid automatic repeat request (HARQ) process to a user equipment (UE) in a subframe of a wireless channel; and
  a second set of codes for causing the computer to re-transmit the data signal or the control signal to the UE prior to a UE response time of the HARQ process
  wherein, transmitting the control signal and the data signal and re-transmitting the data signal or the control signal are performed in subsequent or non-subsequent subframes of the wireless channel based at least in part on estimated receive power at the UE and processing capabilities of the UE.

18. A method of wireless communication, comprising:
 receiving a data transmission on a signal time slot of a hybrid automatic repeat request (HARQ) process;
 receiving a subsequent data transmission on a subsequent signal time slot of the HARQ process;
 decoding a combination of the data transmission and the subsequent data transmission prior to transmitting a feedback signal in response to the data transmission;
 obtaining a control channel signal that governs decoding of data transmissions for the HARQ process; and
 receiving a network instruction that specifies or implies a transmission time interval (TTI) duration that the control channel signal is valid.

19. The method of claim 18, further comprising sending a result of decoding the data transmission and the subsequent data transmission in an uplink acknowledgment (ACK) or negative acknowledgment (NACK) response for the HARQ process.

20. The method of claim 18, further comprising selectively combining the data transmission with the subsequent data transmission or with additional subsequent data transmissions received prior to transmitting the feedback signal.

21. The method of claim 18, further comprising receiving an additional control channel signal within the TTI duration and selecting to decode or to discard the additional control channel signal.

22. The method of claim 18, further comprising deriving a redundancy version (RV) for respective TTIs of the TTI duration from a network mapping function.

23. The method of claim 18, further comprising determining a RV for respective TTIs of the TTI duration based on a cell identifier, a UE identifier or a subframe number in which the control channel signal or the data transmission is received, or a combination thereof.

24. An apparatus configured for wireless communication, comprising:
a communication interface for exchanging wireless signals with a base station;
a memory for storing instructions configured to provide hybrid automatic repeat request (HARQ) functions for a wireless communication; and
a data processor for executing modules to implement the instructions, the modules comprising:
a buffering module that obtains multiple data signals received by the communication interface within a feedback response window of a HARQ process; and
an analysis module that combines the multiple data signals for decoding if a receive energy of at least one signal of the multiple data signals is below a target signal to noise ratio (SNR) level, wherein the analysis module decodes a control channel instruction that contains information on locating and decoding the multiple data signals, or re-transmissions thereof.

25. The apparatus of claim 24, further comprising a feedback module that performs acknowledgment (ACK) or negative acknowledgment (NACK) signaling (ACK/NACK signaling) in response to the multiple data signals.

26. The apparatus of claim 24, further comprising a validity module that identifies a duration for which the control channel instruction is valid.

27. The apparatus of claim 26, wherein the validity module explicitly determines the duration from the control channel instruction or a related control channel instruction, from radio resource control signaling, or from system information signaling, or a combination thereof.

28. The apparatus of claim 26, further comprising an iteration module that identifies a transmission specific variable for downlink transmissions within the duration from a deterministic mapping function based on:
a cell identifier;
a user equipment identifier; or
a subframe of the control channel instruction, or a combination thereof.

29. The apparatus of claim 28, wherein the transmission specific variable comprises a redundancy version associated with the downlink transmissions.

30. The apparatus of claim 24, further comprising a power estimation module that instructs the analysis module to combine a number of the multiple data signals that is sufficient to meet the target SNR level.

31. An apparatus configured for wireless communication, comprising:
means for receiving a data transmission on a signal time slot of a hybrid automatic repeat request (HARQ) process;
means for receiving a subsequent data transmission on a subsequent signal time slot of the HARQ process;
means for decoding a combination of the data transmission and the subsequent data transmission prior to transmitting a feedback signal in response to the data transmission;
means for obtaining a control channel signal that governs decoding of data transmissions for the HARQ process; and
means for receiving a network instruction that specifies or implies a transmission time interval (TTI) duration that the control channel signal is valid.

32. At least one processor configured for wireless communication, comprising:
a first module for receiving a data transmission on a signal time slot of a hybrid automatic repeat request (HARQ) process;
a second module for receiving a subsequent data transmission on a subsequent signal time slot of the HARQ process;
a third module for decoding a combination of the data transmission and the subsequent data transmission prior to transmitting a feedback signal in response to the data transmission;
a fourth module for obtaining a control channel signal that governs decoding of data transmissions for the HARQ process; and
a fifth module for receiving a network instruction that specifies or implies a transmission time interval (TTI) duration that the control channel signal is valid.

33. A computer program product, comprising:
a non-transitory computer-readable medium, comprising:
a first set of codes for causing a computer to receive a data transmission on a signal time slot of a hybrid automatic repeat request (HARQ) process;
a second set of codes for causing the computer to receive a subsequent data transmission on a subsequent signal time slot of the HARQ process;
a third set of codes for causing the computer to decode a combination of the data transmission and the subsequent data transmission prior to transmitting a feedback signal in response to the data transmission;
a fourth set of codes for causing the computer to obtain a control channel signal that governs decoding of data transmissions for the HARQ process; and
a fifth set of codes for causing the computer to receive a network instruction that specifies or implies a transmission time interval (TTI) duration that the control channel signal is valid.

34. A method for wireless communication comprising:
transmitting a control signal and a data signal in a hybrid automatic repeat request (HARQ) process to a user equipment (UE) in a subframe; and
re-transmitting the data signal or the control signal to the UE prior to a UE response time of the HARQ process, wherein re-transmitting the data signal or the control signal is performed in non-subsequent subframes that are prior to the UE response time.

35. A method for wireless communication comprising:
transmitting a control signal and a data signal in a hybrid automatic repeat request (HARQ) process to a user equipment (UE) in a subframe of a wireless channel;
querying the UE for signal processing capabilities of the UE;
receiving the signal processing capabilities;
selecting between re-transmitting the data signal or the control signal in subsequent or non-subsequent subframes of the wireless channel based at least in part on estimated receive power at the UE and the signal processing capabilities of the UE; and
re-transmitting the data signal or the control signal to the UE prior to a UE response time of the HARQ process.

36. A method for wireless communication comprising:
transmitting a control signal and a data signal in a hybrid automatic repeat request (HARQ) process to a user equipment (UE) in a subframe of a wireless channel;
re-transmitting the data signal or the control signal to the UE prior to a UE response time of the HARQ process;
identifying a power constraint that governs transmissions to the UE;
selecting between re-transmitting the data signal or the control signal in subsequent or non-subsequent subframes of the wireless channel based at least in part on estimated receive power at the UE and processing capabilities of the UE; and
re-transmitting the data signal or the control signal at or below the power constraint prior to the UE response time to increase effective receive energy observed at the UE.

37. A method for wireless communication comprising:
transmitting a control signal and a data signal in a hybrid automatic repeat request (HARQ) process to a user equipment (UE) in a subframe of a wireless channel;
deriving downlink channel conditions observed by the UE at least in part on ACK/NACK signals pertaining to the control signal and the data signal transmitted by the UE;
employing the downlink channel conditions for resource scheduling pertaining to re-transmitting the data signal or the control signal;
selecting between re-transmitting the data signal or the control signal in subsequent or non-subsequent subframes of the wireless channel based at least in part on estimated receive power at the UE and processing capabilities of the UE: and
re-transmitting the data signal or the control signal to the UE prior to a UE response time of the HARQ process.

38. An apparatus for wireless communication, comprising:
a communication interface for employing a wireless transceiver to exchange wireless signals with a user equipment (UE);
a memory for storing instructions to provide reduced delay for hybrid automatic repeat request (HARQ) signals in a wireless communication; and
a data processor for executing modules that implement the instructions, the modules comprising:
a control module that establishes re-transmission timing for control or data signals of a HARQ process;
a transmission module that employs the re-transmission timing to transmit and then re-transmit a control signal or a data signal for the HARQ process in less than a minimum separation time of the HARQ process; and
a power module that identifies a transmit power constraint for the wireless communication and a target receive energy of the UE, wherein the power module instructs the transmission module to re-transmit the control signal or the data signal a number of times sufficient to increase receive energy of the control signal or the data signal up to the target receive energy.

39. The apparatus of claim 38, wherein the transmission module sends an instruction to the UE indicating that multiple control transmissions or multiple data transmissions within the minimum separation time are to be treated as re-transmitted signals, and combined to increase receive energy of respective transmissions at the UE.

40. A method of wireless communication, comprising:
receiving a data transmission on a signal time slot of a hybrid automatic repeat request (HARQ) process;
receiving a subsequent data transmission on a subsequent signal time slot of the HARQ process;
decoding a combination of the data transmission and the subsequent data transmission prior to transmitting a feedback signal in response to the data transmission; and
selectively combining the data transmission with the subsequent data transmission or with additional subsequent data transmissions received prior to transmitting the feedback signal, wherein selectively combining the data transmission with the subsequent data transmission or with additional subsequent data transmissions is based at least in part on a receive energy of the data transmission and processing capability of a user equipment (UE) receiving the data transmission.

41. A method of wireless communication, comprising:
receiving a data transmission on a signal time slot of a hybrid automatic repeat request (HARQ) process;
receiving a subsequent data transmission on a subsequent signal time slot of the HARQ process;
decoding a combination of the data transmission and the subsequent data transmission prior to transmitting a feedback signal in response to the data transmission; and
inferring that the subsequent data transmission is a re-transmission of the HARQ process if received prior to scheduled feedback signaling for the data transmission.

42. A method of wireless communication, comprising:
receiving a data transmission on a signal time slot of a hybrid automatic repeat request (HARQ) process;
receiving a subsequent data transmission on a subsequent signal time slot of the HARQ process;
decoding a combination of the data transmission and the subsequent data transmission prior to transmitting a feedback signal in response to the data transmission; and
receiving a request for processing capability of a UE receiving the data transmission, and responding with a metric of the processing capability, wherein a number of subsequent data transmissions or a transmission time interval delay of the subsequent data transmission is based at least in part on the metric of the processing capability.

43. An apparatus configured for wireless communication, comprising:
a communication interface for exchanging wireless signals with a base station;
a memory for storing instructions configured to provide hybrid automatic repeat request (HARQ) functions for a wireless communication; and
a data processor for executing modules to implement the instructions, the modules comprising:
a buffering module that obtains multiple data signals received by the communication interface within a feedback response window of a HARQ process, wherein the feedback response window is defined to begin with a transmission time interval (TTI) in which a first of the multiple data signals is transmitted, and terminate with a subsequent TTI in which ACK/NACK signaling is scheduled; and
an analysis module that combines the multiple data signals for decoding if a receive energy of at least one signal of the multiple data signals is below a target signal to noise ratio (SNR) level.

44. An apparatus configured for wireless communication, comprising:
a communication interface for exchanging wireless signals with a base station;
a memory for storing instructions configured to provide hybrid automatic repeat request (HARQ) functions for a wireless communication; and a data processor for executing modules to implement the instructions, the modules comprising:
- a buffering module that obtains multiple data signals received by the communication interface within a feedback response window of a HARQ process; and
- an analysis module that combines the multiple data signals for decoding if a receive energy of at least one signal of the multiple data signals is below a target signal to noise ratio (SNR) level; and
- a timing module that limits a number of the multiple data signals combined by the analysis module for decoding based at least in part on processing speed of the apparatus in comparison with size of the feedback response window, or location of respective data signals within the feedback response window.

45. An apparatus configured for wireless communication, comprising:
- a communication interface for exchanging wireless signals with a base station;
- a memory for storing instructions configured to provide hybrid automatic repeat request (HARQ) functions for a wireless communication; and
- a data processor for executing modules to implement the instructions, the modules comprising:
  - a buffering module that obtains multiple data signals received by the communication interface within a feedback response window of a HARQ process;
  - an analysis module that combines the multiple data signals for decoding if a receive energy of at least one signal of the multiple data signals is below a target signal to noise ratio (SNR) level; and
  - a synchronization module that provides the base station with an energy measurement for signals received from the base station, and a processing speed for the apparatus, to facilitate transmission of a suitable number of the multiple data signals, or time-based scheduling of respective data signals.

* * * * *